United States Patent
Bae et al.

(10) Patent No.: US 10,745,016 B2
(45) Date of Patent: Aug. 18, 2020

(54) DRIVING SYSTEM FOR VEHICLE AND VEHICLE

(71) Applicant: LG Electronics Inc., Seoul (KR)

(72) Inventors: Hyeonju Bae, Seoul (KR); Jonghyun Oh, Seoul (KR); Taehui Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 15/857,862

(22) Filed: Dec. 29, 2017

(65) Prior Publication Data

US 2019/0016340 A1    Jan. 17, 2019

(30) Foreign Application Priority Data

Jul. 12, 2017    (KR) .......................... 10-2017-0088538

(51) Int. Cl.
  *B60W 40/04*    (2006.01)
  *B60W 50/029*    (2012.01)
  (Continued)

(52) U.S. Cl.
  CPC ............ *B60W 40/04* (2013.01); *B60W 30/09* (2013.01); *B60W 30/10* (2013.01); *B60W 30/12* (2013.01);
  (Continued)

(58) Field of Classification Search
  CPC .... B60W 40/04; B60W 50/029; B60W 30/10; B60W 30/16; B60W 30/09; B60W 30/12; B60W 30/14; B60W 30/18109; B60W 50/08; B60W 2552/05; B60W 2554/00; B60W 2555/20; B60W 2556/50; B60W 2556/65; B60W 2050/0215;
  (Continued)

(56) References Cited

U.S. PATENT DOCUMENTS 10,203,699 B1 *   2/2019   Kim ..................... G05D 1/0022
10,414,356 B2 *   9/2019   Kim .................. G06K 9/00798
(Continued)

FOREIGN PATENT DOCUMENTS

DE    102011082398    3/2013
DE    102016013726    5/2017
(Continued)

OTHER PUBLICATIONS

European Search Report in European Appln. No. 18181851.9, dated Nov. 21, 2018, 9 pages.

*Primary Examiner* — Russell Frejd
(74) *Attorney, Agent, or Firm* — Fish & Richardson P.C.

(57) ABSTRACT

A driving system for a vehicle includes: a communication apparatus; at least one processor; and a computer-readable medium having stored thereon instructions that, when executed by the at least one processor, cause the at least one processor to perform operations that include: receiving, through the communication apparatus, Advanced Driver Assistance system (ADAS) information that is based on a location of the vehicle; determining, based on the ADAS information, whether to use at least one ADAS for the vehicle; and based on a determination of whether to use the at least one ADAS for the vehicle, providing a control signal for controlling at least one of a steering operation, a brake operation, or an acceleration operation of the vehicle.

19 Claims, 21 Drawing Sheets

(51) Int. Cl.
*G08G 1/01* (2006.01)
*B60W 30/10* (2006.01)
*G08G 1/0967* (2006.01)
*B60W 30/16* (2020.01)
*G08G 1/048* (2006.01)
*B60W 30/09* (2012.01)
*B60W 30/12* (2020.01)
*B60W 30/14* (2006.01)
*B60W 30/18* (2012.01)
*B60W 50/08* (2020.01)
*B60W 50/02* (2012.01)

(52) U.S. Cl.
CPC ............ *B60W 30/14* (2013.01); *B60W 30/16* (2013.01); *B60W 30/18109* (2013.01); *B60W 50/029* (2013.01); *B60W 50/08* (2013.01); *G08G 1/0112* (2013.01); *G08G 1/0129* (2013.01); *G08G 1/0133* (2013.01); *G08G 1/0141* (2013.01); *G08G 1/048* (2013.01); *G08G 1/096725* (2013.01); *G08G 1/096741* (2013.01); *G08G 1/096775* (2013.01); *G08G 1/096791* (2013.01); *B60W 2050/0215* (2013.01); *B60W 2050/0295* (2013.01); *B60W 2420/40* (2013.01); *B60W 2420/52* (2013.01); *B60W 2540/22* (2013.01); *B60W 2552/05* (2020.02); *B60W 2554/00* (2020.02); *B60W 2555/20* (2020.02); *B60W 2556/50* (2020.02); *B60W 2556/65* (2020.02)

(58) Field of Classification Search
CPC ..... B60W 2050/0295; B60W 2420/40; B60W 2420/52; B60W 2540/22; B60W 50/035; B60W 10/18; B60W 10/20; B60W 40/105; B60W 2050/021; G08G 1/0141; G08G 1/0129; G08G 1/0112; G08G 1/0133; G08G 1/096791; G08G 1/096775; G08G 1/096741; G08G 1/048; G08G 1/096725; B60R 16/02
See application file for complete search history.

(56) References Cited

U.S. PATENT DOCUMENTS

| | | | | |
|---|---|---|---|---|
| 2013/0226400 | A1* | 8/2013 | King | G01C 21/32 |
| | | | | 701/36 |
| 2015/0300825 | A1* | 10/2015 | Manoliu | G01C 21/32 |
| | | | | 701/36 |
| 2016/0091609 | A1* | 3/2016 | Ismail | G01S 19/49 |
| | | | | 702/150 |
| 2018/0012085 | A1* | 1/2018 | Blayvas | G06F 3/017 |

FOREIGN PATENT DOCUMENTS

| | | |
|---|---|---|
| DE | 102015225152 | 6/2017 |
| EP | 2921362 | 9/2015 |
| JP | 2016016765 | 2/2016 |
| JP | WO2016013574 | 4/2017 |
| KR | 101589427 | 1/2016 |
| KR | 1020170004715 | 1/2017 |
| KR | 1020170017203 | 2/2017 |

* cited by examiner

FIG. 1
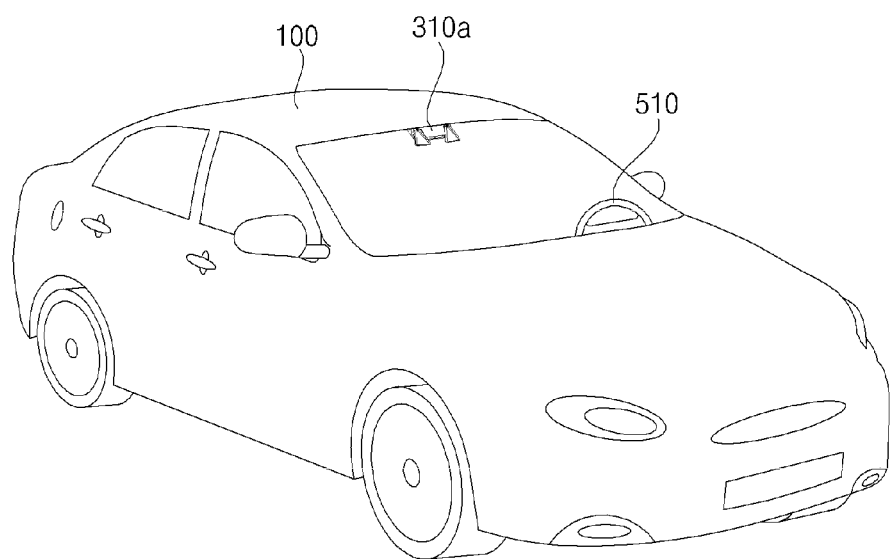
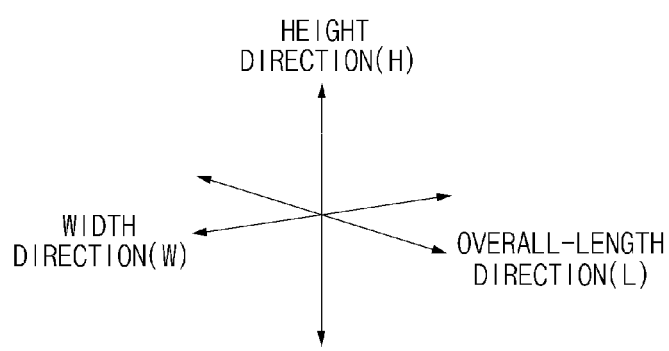

FIG. 16
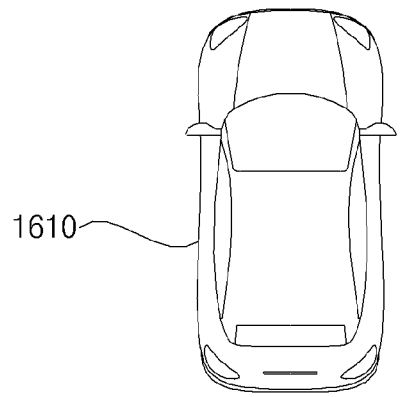
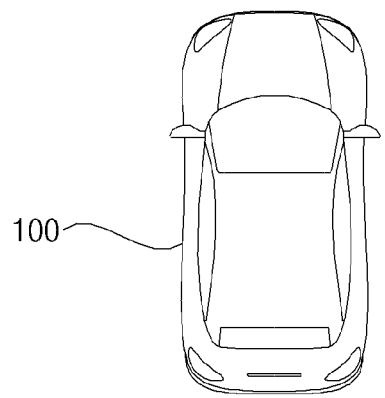

| | Camera | Radar | Lidar | Ultra-Sonic | AVM | V2X | Location Information & Map | Internal Camera | Gyro Sensor/Accelerometer | Infrared Sensor |
|---|---|---|---|---|---|---|---|---|---|---|
| Adaptive Crusie Control | O | O | O | | | O | | | | |
| Lane Keep Assistance System | O | | | | | | O | | | |
| Lane Change | O | O | O | | | O | | | | |
| Blind Spot Detection | | O | O | | | O | | | | |
| Automatic Emergency BRAKING | O | O | O | | | O | | | | |
| Forward Collision Warning | O | O | O | | | O | | | | |
| Pedestrian Collision Warning | O | O | O | | | | | | | |
| Traffic Sign Recognition | O | | | | | O | | | | |
| Intelligent High-Beam Control | O | | | | | O | | | | |
| Night Vision | | | | | | | | | | O |
| Driver Status Monitor | | | | | | | | O | | |
| Autonomous Parking | O | O | O | O | O | | O | | | |
| Traffic Jam Assist | O | O | O | O | | | | | | |

FIG. 18

| List | Ideal case | | | Updates based on a user's feedback |
|---|---|---|---|---|
| | Time | | Place | |
| | Day | Night | ex: Accident Zone Construction Zone | ex: Error/Failed Recognition in Specific Zone Frequent Driver Override Zone |
| ACC | O | O | X | ex: It is hard to cover a cut-in vehicle in traffic jam during both of daytime and nighttime |
| AEB, FCW | O | O | O | ex: Mistakenly recognize a guard rail as an obstacle only in a specific zone (curved zone) |
| LKA | O | O | X | ex: Fail to recognize a straight road after coming out of an IC curve after Seongsan bridge toward Dangjin<br>ex: When a vehicle exits Namsan 1st tunnel after travelling in the first lane (at 60~70km/h), the road sharply curves to the left and LKA is not allowed. |
| LCA | O | O | X | |
| TFA | O | O | X | |
| BSD | O | O | O | |
| Intelligent High beam Control | – | O | O | |
| Auto Parking | O | O | X | |
| PD Collision warning | O | O | O | |
| TSR | O | O | X | |
| TSA | O | O | X | |
| Night Vision | | O | O | |
| Driver Status Monitor | O | O | O | |
| TJA=TFA+LKA+ACC | O | O | X | ex: Error occurs after and before a highway interchange, at a junction, and at a sharp curve |

FIG. 19

| List | Examples of how to implement over V2X |
|---|---|
| ACC | Acceleration/deceleration is allowed if information about a vehicle ahead is received |
| AEB, FCW | Warning of deceleration is allowed if information about a vehicle ahead is received It is not possible to respond to an obstacle other than a vehicle |
| LKA | It can be used if lane recognition information of a vehicle ahead is received |
| LCA | It can be used if information about a nearby vehicle is received. |
| TFA | It can be used if information about a nearby vehicle is received. |
| BSD | It is possible to perform BSD if which lane a nearby vehicle is located relative to a host vehicle and a speed the nearby vehicle is travelling are informed. |
| Intelligent High beam Control | It is possible to perform beam controlling by receiving oncoming vehicle information over V2X. |
| Auto Parking | It is possible to receive parking lot map information, information about an empty parking slot, etc. |
| PD Collision warning | It can be used if information as to whether a pedestrian is present is received over V2X |
| TSR | It is possible to display information based on traffic sign information received over V2X |
| TSA | It is possible to decelerate based on traffic sign information received over V2X |
| TJA=TFA+LKA+ACC | It can be used if information about a vehicle ahead and a nearby vehicle is received |

FIG. 20

DRIVING SYSTEM FOR VEHICLE AND VEHICLE

CROSS-REFERENCE TO RELATED APPLICATION

This application claims the benefit of an earlier filing date and right of priority to Korean Patent Application No. 10-2017-0088538, filed on Jul. 12, 2017 in the Korean Intellectual Property Office, the disclosure of which is incorporated herein by reference.

TECHNICAL FIELD

The present disclosure relates to a driving system for a vehicle.

BACKGROUND

A vehicle is an apparatus that moves in a direction desired by a user riding therein. A common example of a vehicle is an automobile.

Vehicles are typically equipped with various types of sensors and electronic devices designed to improve convenience of a user. For example, Advance Driver Assistance Systems (ADASs) have been studied and researched to help improve driver convenience. In addition, efforts have been made to develop autonomous vehicles that autonomously perform one or more driving operations.

SUMMARY

Implementations disclosed herein provide a driving system for a vehicle that adaptively determines whether to use one or more Advanced Driver Assistance Systems (ADASs) based on information related to an environment of the vehicle.

In one aspect, a driving system for a vehicle includes: a communication apparatus; at least one processor; and a computer-readable medium having stored thereon instructions that, when executed by the at least one processor, cause the at least one processor to perform operations including: receiving, through the communication apparatus, Advanced Driver Assistance System (ADAS) information that is based on a location of the vehicle; determining, based on the ADAS information, whether to use at least one ADAS for the vehicle; and based on a determination of whether to use the at least one ADAS for the vehicle, providing a control signal for controlling at least one of a steering operation, a brake operation, or an acceleration operation of the vehicle.

In some implementations, the operations further include: acquiring, through the communication apparatus, information about a utilization of a first ADAS by a second vehicle in a scheduled travel zone of the vehicle; and based on the information about the utilization of the first ADAS by the second vehicle, determining whether to use at least one ADAS for the vehicle.

In some implementations, the operations further include: based on a determination that either the vehicle does not include the first ADAS used by the second vehicle or that the vehicle does not include a sensor used by the first ADAS, receiving, from the second vehicle, vehicle control information relevant to the scheduled travel zone of the vehicle. Providing the control signal for controlling the at least one of the steering operation, the brake operation, or the acceleration operation of the vehicle is further based on the vehicle control information received from the second vehicle.

In some implementations, determining, based on the ADAS information, whether to use at least one ADAS for the vehicle includes: determining, based on the ADAS information, at least one of a first ADAS that is to be utilized for the vehicle or a second ADAS that is not to be utilized for the vehicle based on the location of the vehicle.

In some implementations, the operations further include: acquiring, through the communication apparatus, information about the at least one ADAS for which an error occurs in a scheduled travel zone of the vehicle; and determining to turn off the at least one ADAS for which the error occurs in the scheduled travel zone.

In some implementations, the operations further include: transmitting, through the communication apparatus and to at least one of another vehicle or a server, ADAS information generated in a scheduled travel zone of the vehicle.

In some implementations, the driving system further includes a user interface apparatus, and the operations further include controlling the user interface apparatus to output the ADAS information.

In some implementations, the operations further include: receiving, through the communication apparatus, driving situation information that is based on the location of the vehicle, and determining whether to use at least one ADAS for the vehicle is further based on the received driving situation information.

In some implementations, the operations further include: receiving, through the communication apparatus, weather information for a scheduled travel zone of the vehicle, and determining whether to use at least one ADAS for the vehicle is further based on the received weather information.

In some implementations, the operations further include: receiving, through the communication apparatus, first information about a first ADAS used in the scheduled travel zone of the vehicle under a first weather condition, and determining whether to use at least one ADAS for the vehicle is further based on the received first information about the first ADAS that is used in the scheduled travel zone under the first weather condition.

In some implementations, the operations further include: receiving, through the communication apparatus, second information about a first ADAS for which an error occurs in the scheduled travel zone of the vehicle under a first weather condition; and, based on the second information, determining to deactivate, in the vehicle, the first ADAS for which the error occurs in the scheduled travel zone under the first weather condition.

In some implementations, the operations further include: receiving, through the communication apparatus, at least one of accident occurrence information or construction information for a scheduled travel zone of the vehicle. Determining whether to use at least one ADAS for the vehicle is further based on the at least one of the accident occurrence information or the construction information.

In some implementations, the operations further include: determining to deactivate an Adaptive Cruise Control (ACC) system and to activate an Autonomous Emergency Braking (AEB) system of the vehicle.

In some implementations, the operations further include: receiving, through the communication apparatus, traffic congestion information for a scheduled travel zone of the vehicle. Determining whether to use at least one ADAS for the vehicle is further based on the traffic congestion information for the scheduled travel zone of the vehicle.

In some implementations, the operations further include: determining to deactivate an Autonomous Emergency Braking (AEB) system and to activate a Traffic Jam Assist (TJA) system.

In some implementations, the operations further include: receiving, through the communication apparatus and from a second vehicle, information about an object located in a scheduled travel zone of the vehicle. Determining whether to use at least one ADAS for the vehicle is further configured to, further based on the information about the object located in the scheduled travel zone of the vehicle.

In some implementations, the operations further include: receiving, through the communication apparatus, third information about a first ADAS used in a highway zone; and based on the third information, activating an Adaptive Cruise Control (ACC) system, a Lane Keeping Assist (LKA) system, and a Blind Spot Detection (BPD) system of the vehicle.

In some implementations, the operations further include: receiving, through the communication apparatus, fourth information about a first ADAS used in an intersection zone; and based on the fourth information, determining to deactivate an Adaptive Cruise Control (ACC) system and turn on an Autonomous Emergency Braking (AEB) system of the vehicle.

In some implementations, the operations further include: receiving, through the communication apparatus, fifth information about a first ADAS used in a curved zone; and based on the fifth information, determining to deactivate an Adaptive Cruise Control (ACC) system and to activate an Autonomous Emergency Braking (AEB) system of the vehicle.

In some implementations, the operations further include: receiving, through the communication apparatus, sixth information about an ADAS used in a zone where a roadway is not defined; and based on the sixth information, determining to turn off a Lane Keeping Assist (LKA) system and turn on a Target Following Assist (TFA) system of the vehicle.

In another aspect, a vehicle includes: a driving system; and a plurality of wheels controlled based on a signal from the driving system. The driving system includes: a communication apparatus; at least one processor; and a computer-readable medium having stored thereon instructions that, when executed by the at least one processor, cause the at least one processor to perform operations including: receiving, through the communication apparatus, Advanced Driver Assistance system (ADAS) information that is based on a location of the vehicle; determining, based on the ADAS information, whether to use at least one ADAS for the vehicle; and based on a determination of whether to use the at least one ADAS for the vehicle, providing a control signal for controlling at least one of a steering operation, a brake operation, or an acceleration operation of the vehicle.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 1 is diagram illustrating an example of the external appearance of a vehicle according to an implementation;

FIG. 16 is a diagram illustrating an example of an operation of a driving system according to an implementation;

FIG. 18 is diagram illustrating examples of sensors and devices used by different ADASs according to an implementation;

FIG. 19 is a diagram illustrating examples of zones and situation information classified with reference to use of a plurality of ADASs according to an implementation;

FIG. 20 is a diagram illustrating an example of an operation implemented by an ADAS using a V2X communication unit.

DETAILED DESCRIPTION

Various types of Advanced Driver Assistance Systems (ADASs) may be implemented in a vehicle to perform different functions and to enhance user convenience in different ways. However, in some scenarios, an error may occur in an ADAS operation when operated in a particular geographic area or in a particular situation. In such scenarios, using the ADAS could potentially increase the risk of an accident.

Implementations disclosed herein may address such problems by providing a driving system for a vehicle that is configured to adaptively determine whether to use an ADAS based on information related to the vehicle, such as a location of the vehicle.

In some implementations, the driving system may selectively activate and/or deactivate specific ADAS features based on information regarding an environment of the vehicle. The information may be generated by the vehicle itself or may be received from another source, such as another vehicle.

In some implementations, if the driving system determines that the vehicle does not have available a particular ADAS that should be used in a particular scenario, then the driving system may control the vehicle based on vehicle control information received from another vehicle that does implement that particular ADAS. For example, the driving system may control at least one of the vehicle's steering operation, brake operation, or acceleration operation based on such vehicle control information.

In some scenarios, implementations of the present disclosure may have one or more effects as follows.

First, the driving system may enable use of an ADAS depending on a situation, even without an explicit user input.

Second, by adaptively determining whether or not to use a particular ADAS for different geographic regions, the driving system may reduce the risk of malfunctions or errors when using the ADAS in those geographic regions.

Third, by selectively using ADASs that are appropriate for different scenarios, the driving system may help reduce the risk of traffic accidents.

Effects of the present disclosure are not limited to the aforementioned effects and other unmentioned effects will be clearly understood by those skilled in the art from the claims.

A vehicle as described in this specification may include any suitable motorized vehicle, such as an automobile and a motorcycle. Hereinafter, a description will be given based on an automobile.

A vehicle as described in this specification may be powered by any suitable source of power, and may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 2:
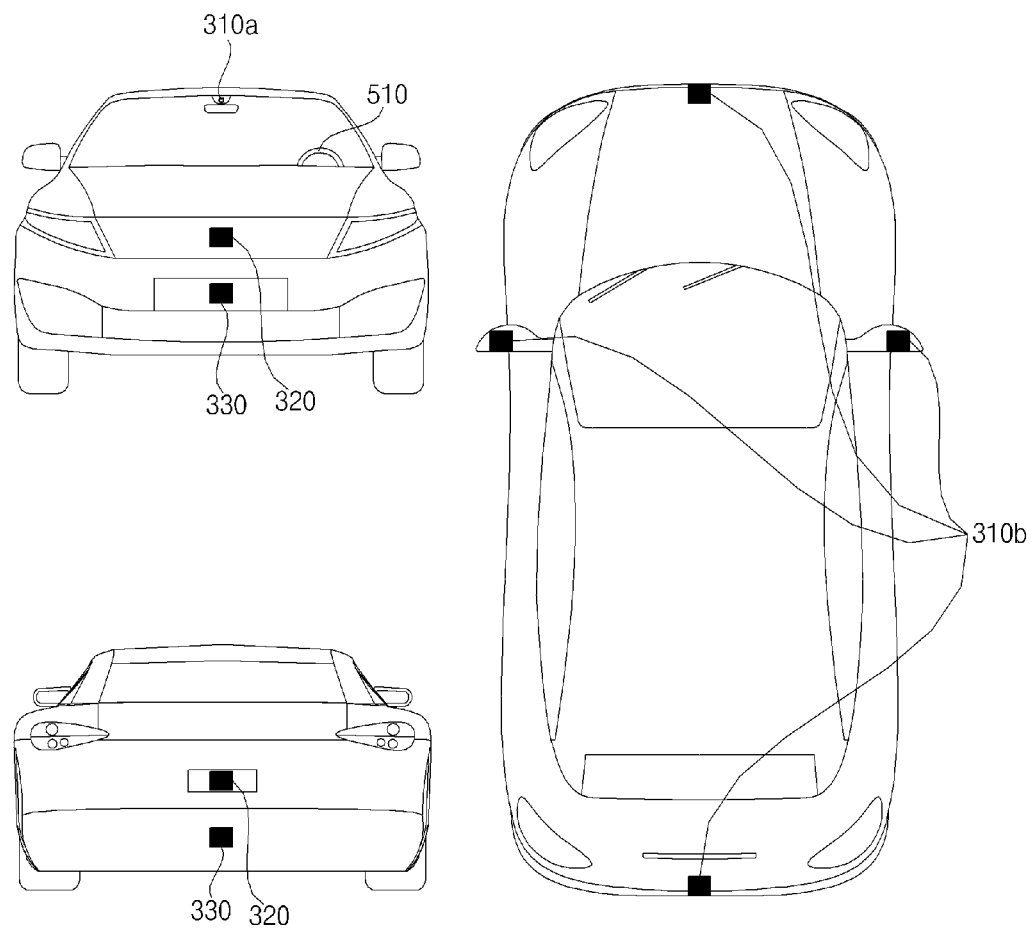
FIG. 2 is a diagram illustrating an example of different angled views of the external appearance of a vehicle according to an implementation.
Figure 3:
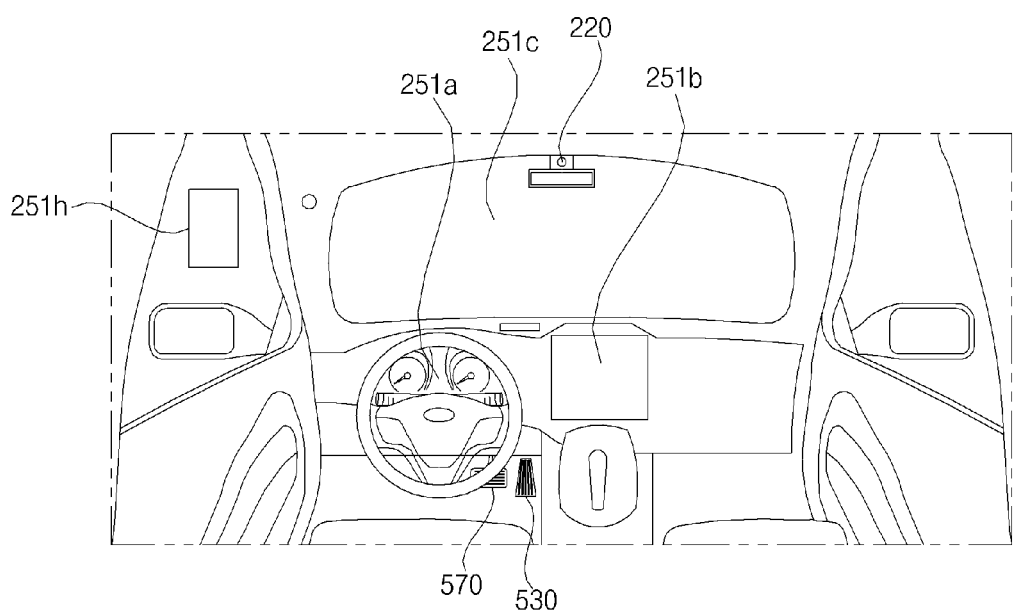
FIGS. 3 and 4 are diagrams illustrating examples of the interior configuration of a vehicle according to an implementation.
Figure 4:
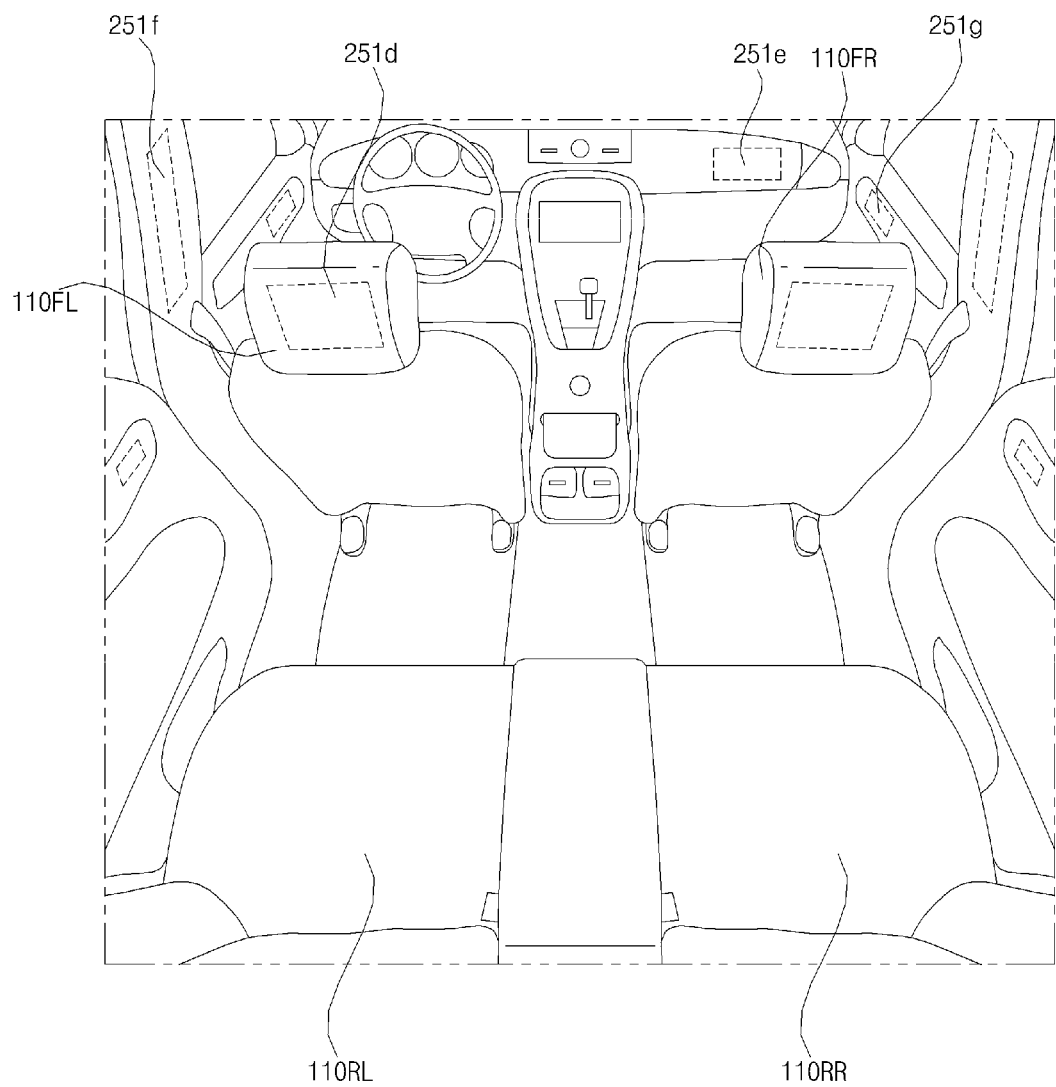
Figure 5:
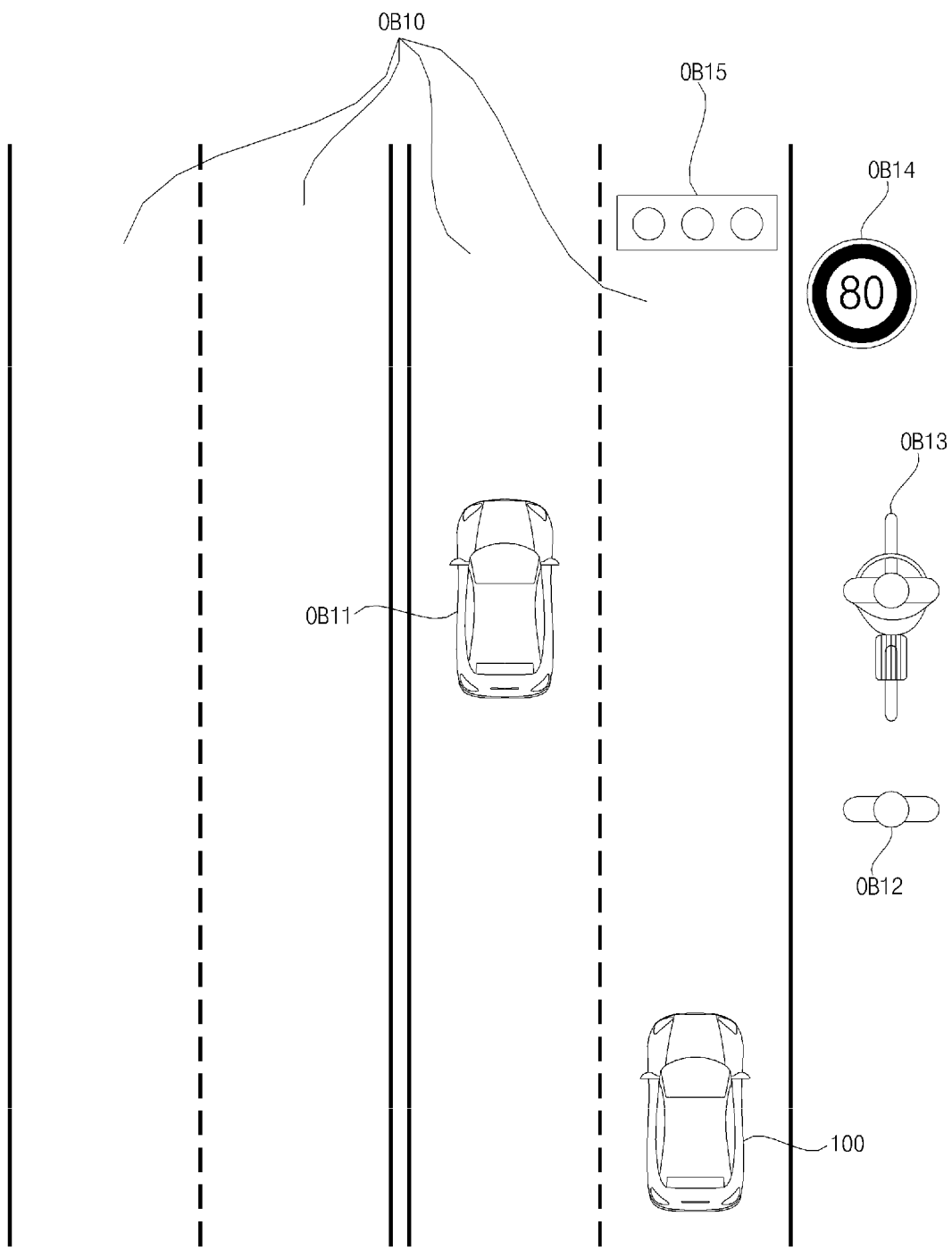
FIGS. 5 and 6 are diagrams illustrating examples of an object detected by a vehicle according to an implementation.
Figure 6:
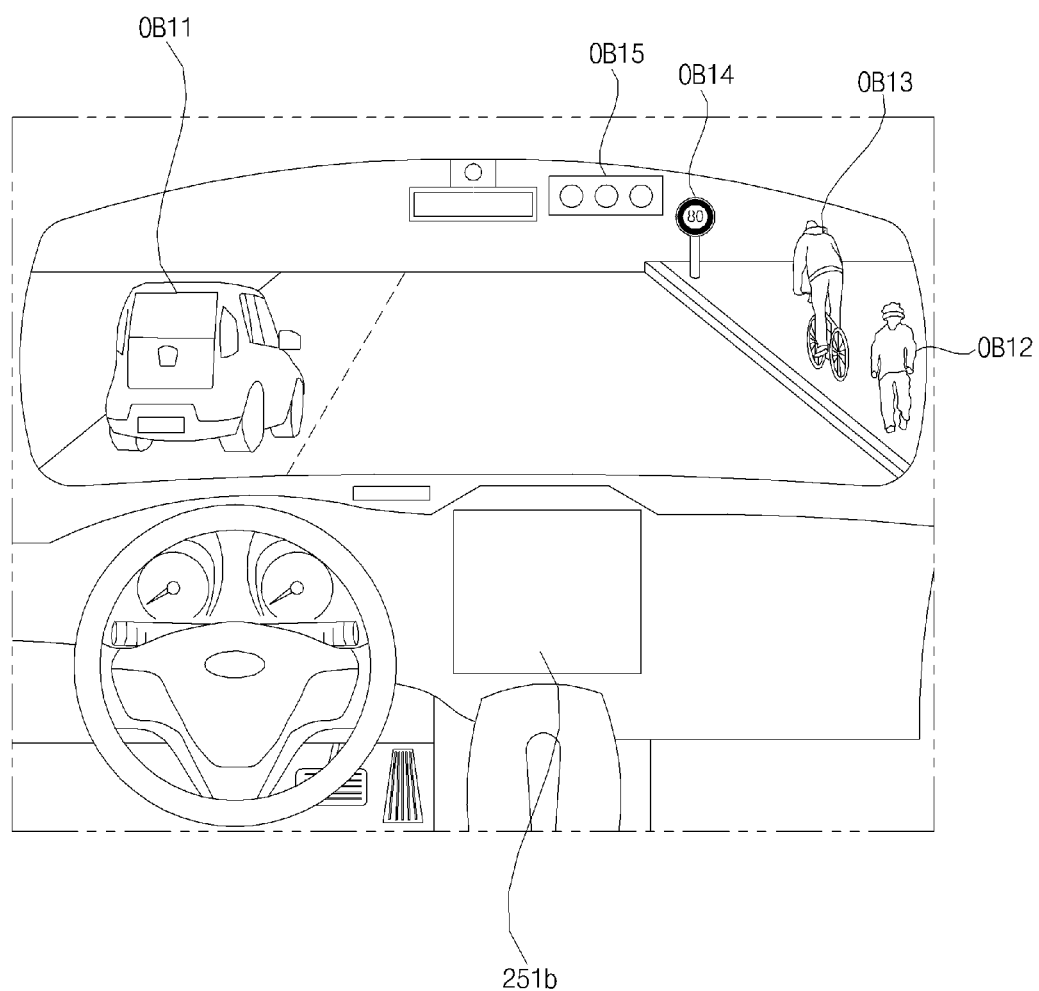
Figure 7:
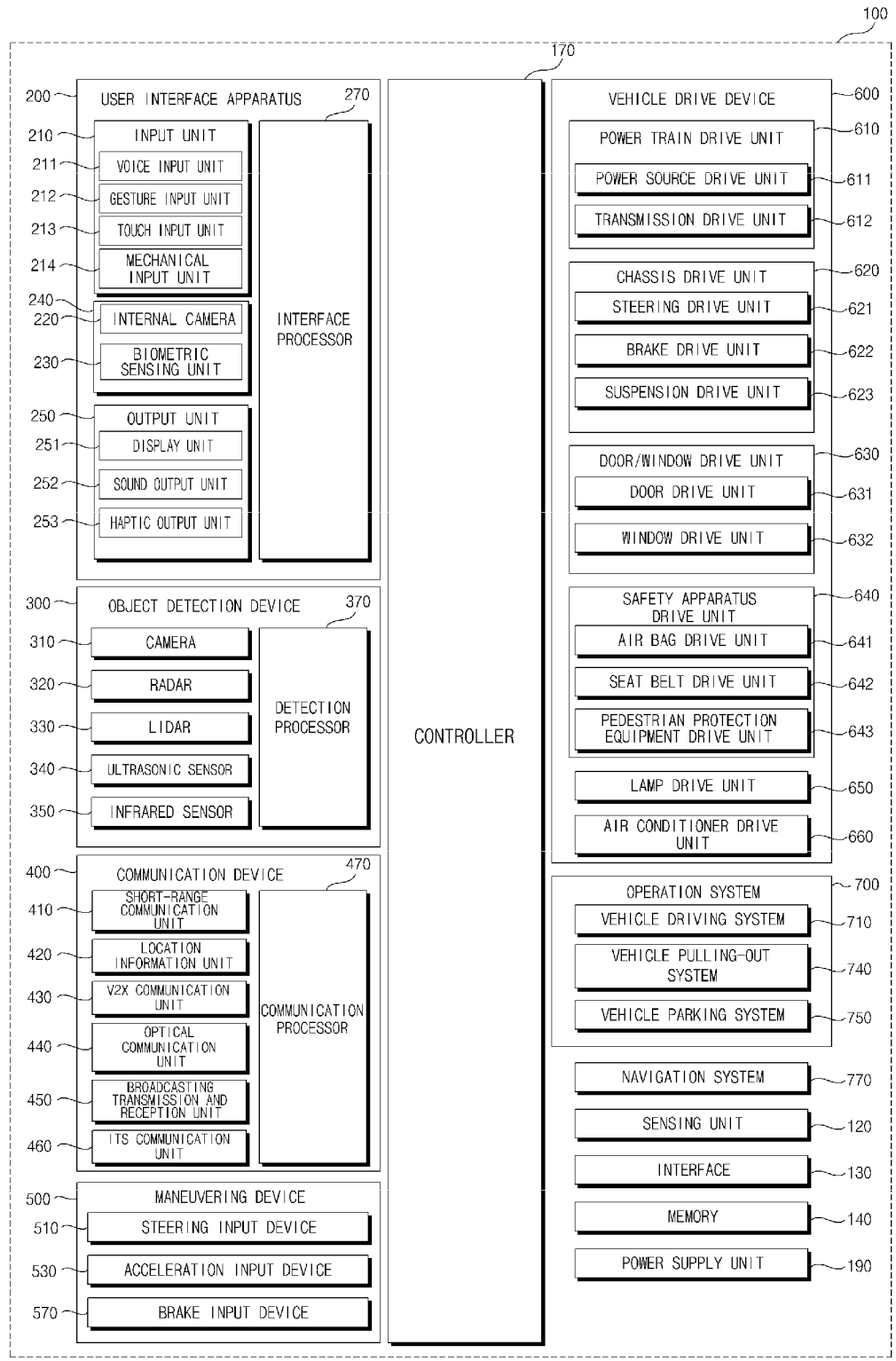
FIG. 7 is a block diagram illustrating an example of a vehicle according to an implementation.

FIG. 1 is an example of the external appearance of a vehicle according to an implementation. FIG. 2 is an example of different angled views of a vehicle according to an implementation. FIGS. 3 and 4 are examples of views of the internal configuration of a vehicle according to an implementation. FIGS. 5 and 6 are examples of views for explanation of objects according to an implementation. FIG. 7 is a block diagram illustrating an example of a vehicle according to an implementation.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous driving mode or a manual mode in response to a user input.

For example, in response to a user input received through a user interface device 200, the vehicle 100 may be switched from a manual mode to an autonomous driving mode, or vice versa.

The vehicle 100 may be switched to an autonomous mode or a manual mode based on driving situation information.

The driving situation information may include at least one of information on an object outside a vehicle, navigation information, and vehicle condition information.

For example, the vehicle 100 may be switched from the manual mode to the autonomous driving mode, or vice versa, based on driving situation information generated in the object detection device 300.

In another example, the vehicle 100 may be switched from the manual mode to the autonomous driving mode, or vice versa, based on driving situation information received through a communication device 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on a vehicle travel system 700.

For example, the autonomous vehicle 100 may operate based on information, data, or signals generated in a driving system 710, a parking-out system 740, and a parking system 750.

In the manual mode, the autonomous vehicle 100 may receive a user input for driving the vehicle 100 through a driving operation device 500. The vehicle 100 may operate based on the user input received through the driving operation device 500.

The vehicle 100 may include the driving system 710.

A plurality of wheels may be controlled based on a signal provided by the driving system 710.

The term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, at least one processor such as controller 170, and a power supply unit 190.

In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and at least one processor such as processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 213 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user state based on the images of the inside of the vehicle 100. The processor 270 may acquire information about a user's gaze from an image of the inside of the vehicle 100.

The processor 270 may detect a user's gesture from an image of the inside of the vehicle 100.

The biometric sensing unit 230 may acquire biometric information of the user. The biometric sensing unit 230 may include a sensor for acquire biometric information of the user, and may utilize the sensor to acquire a user's finger print information, heart rate information, etc. The biometric information may be used to authenticate a user's identity.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include any processor 270.

In the case where the user interface apparatus 200 does not include any processor 270, the user interface apparatus 200 may operate under control of the controller 170 or a processor of a different device inside the vehicle 100.

In some implementations, the user interface apparatus 200 may be referred to as a display device for vehicle.

The user interface apparatus 200 may operate under the control of the controller 170.

The object detection apparatus 200 is used to detect an object located outside the vehicle 100.

The object detection apparatus 200 may generate object information based on sensing data.

The object information may include information about the presence of an object, information about a location of the object, information about a distance between the vehicle 100 and the object, and information about a speed of the vehicle 100 relative to the object.

The object may include various objects related to travelling of the vehicle 100.

Referring to FIGS. 5 and 6, an object O may include, for example, a lane OB10, another vehicle OB11, a pedestrian OB12, a two-wheeled vehicle OB13, a traffic sign OB14 and OB15, a light, a road, a structure, a bump, a geographical feature, an animal, etc.

The lane OB10 may be a lane in which the vehicle 100 is traveling, a lane next to the lane in which the vehicle 100 is travelling, or a lane in which a different vehicle is travelling in the opposite direction. The lane OB10 may include left and right lines that define the lane. The lane may be an intersection.

Another vehicle OB11 may be a vehicle travelling in the vicinity of the vehicle 100. Another vehicle OB11 may be a vehicle within a predetermined distance from the vehicle 100. For example, another vehicle OB11 may be a vehicle that is preceding or following the vehicle 100.

The pedestrian OB12 may be a person located in the vicinity of the vehicle 100. The pedestrian OB12 may be a person located within a predetermined distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic sign may include a traffic lamp OB15, a roadside sign OB14, and a pattern or text painted on a road surface.

The light may be light generated by a lamp provided in another vehicle OB11. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic lamp, a bridge, a curb, and a wall.

The geographical feature may include a mountain and a hill.

The object may be classified as a movable object or a stationary object. The movable object may be an object that can move, for example, a nearby vehicle or a pedestrian. The stationary object may be an object that cannot move, for example, a traffic sign, a roadway, a structure, or a line.

The object detection apparatus 300 may include a camera 310, a radar 320, a lidar 330, an ultrasonic sensor 340, an infrared sensor 350, and at least one processor such as processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire information on a location of an object, information on a distance to the object, and information on a speed relative to the object.

For example, the camera 310 may acquire the information on the distance to the object and the information on the speed relative to the object, based on a change in size of the object over time in acquired images.

For example, the camera 310 may acquire the information on the distance to the object and the information on the speed relative to the object through a pin hole model or through profiling a road surface.

In another example, the camera 310 may acquire the information on the distance to the object and the information on the speed relative to the object, based on information on disparity between stereo images acquired by the stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 270.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive-type lidar or a non-drive type lidar.

When implemented as the drive-type lidar, the lidar 330 may rotate by a motor and detect an object in the vicinity of the vehicle 100.

When implemented as the non-drive type lidar, the lidar 330 may utilize a light steering technique to detect an object located within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing sensing data with pre-stored data, the sensing data which is sensed by the camera 310, the radar 320, the lidar 330, the ultrasonic sensor 340, and the infrared sensor 350.

The processor 370 may detect an object and track the detected object based on acquired images. The processor 370 may, for example, calculate the distance to the object and the speed relative to the object.

For example, based on change in size over time of an object in acquired images, the processor 370 may acquire information on distance to the object and information on speed relative to the object.

For example, the processor 370 may acquire information on distance to an object and information on speed relative to the object, by utilizing a pin hole model or by profiling a road surface.

For example, based on information on disparity of stereo images acquired by a stereo camera 310a, the camera 310 may acquire the information on distance to an object and information on speed relative to the object.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 is not included in the processor 370, the object detection apparatus 300 may operate under the control of the controller 170 or a processor inside the vehicle 100.

The object detection apparatus 300 may operate under the control of the controller 170.

The communication apparatus 400 is configured to perform communication with an external device. The external device may be a different vehicle or a server.

To perform communication, the communication apparatus 400 may include at least one selected from a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor such as processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include any processor 470.

In the case where the communication apparatus 400 does not include the processor 470, the communication apparatus 400 may operate under control of the controller 170 or a processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under the control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the driving direction of the vehicle 100. The steering input device 510 may take the form of a wheel to enable a steering input through the rotation thereof. In some implementations, the steering input device may be configured as a touchscreen, a touch pad, or a button.

The acceleration input device 530 may receive a user input for acceleration of the vehicle 100.

The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under the control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include at least one processor. Each unit of the vehicle drive apparatus 600 may include its own processor(s).

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include at least one processor. Each unit of the vehicle dive device 600 may include its own processor(s).

The vehicle drive apparatus 600 may operate under control of the controller 170.

The vehicle travel system 700 is a system for controlling the overall driving operation of the vehicle 100. The vehicle travel system 700 may operate in the autonomous driving mode.

The vehicle travel system 700 may include the driving system 710, the parking-out system 740, and the parking system 750.

In some implementations, the vehicle travel system 700 may further include other components in addition to the aforementioned components, or may not include some of the aforementioned component.

In some implementations, the vehicle travel system 700 may include at least one processor. Each unit of the vehicle travel system 700 may include its own processor(s).

In some implementations, in the case where the vehicle travel system 700 is implemented as software, the vehicle travel system 700 may be implemented by one or more processors, such as controller 170.

In some implementations, the vehicle travel system 700 may include at least one selected from among the user interface apparatus 270, the object detection device 300, the communication device 400, the driving manipulation device 500, the vehicle drive device 600, the navigation system 770, the sensing unit 120, and the controller 170.

The driving system 710 may control driving of the vehicle 100.

The driving system 710 may receive navigation information from the navigation system 700 and provide a control signal to the vehicle drive device 600 so as to control driving of the vehicle 100.

The driving system 710 may receive a signal from an external device through the communication device 400 and provides a control signal to the vehicle drive device 600 so as to control driving of the vehicle 100

The driving system 710 may receive a signal from an external device through the communication apparatus 400 and provide a control signal to the vehicle drive apparatus 600 so as to control driving of the vehicle 100.

The driving system 710 may be a system which includes at least one selected from among the user interface apparatus 270, the object detection device 300, the communication device 400, the driving manipulation device 500, the vehicle drive device 600, the navigation system 770, the sensing unit 120, and the controller 170 so as to control driving of the vehicle 100.

The driving system 710 may be referred to as a vehicle driving control apparatus.

The parking-out system 740 may control exiting of the vehicle 100 from a parking space.

The parking-out system 740 may receive navigation information from the navigation system 770 and provide a control signal to the vehicle drive device 600 so as to control exiting of the vehicle 100 from a parking space.

The parking-out system 740 may receive object information from the object detection apparatus 300 and provide a control signal to the vehicle drive apparatus 600 so as to control exiting of the vehicle 100 from a parking space.

For example, the parking-out system 740 may receive a signal from an external device through the communication apparatus 400 and provide a control signal to the vehicle drive apparatus 600 so as to control exiting of the vehicle 100 from a parking space.

The parking-out system 740 may be a system which includes at least one selected from among the user interface device 200, the object detection device 300, the communication device 400, the driving manipulation device 500, the vehicle drive device 600, the navigation system 700, the sensing unit 120, and the controller 170 so as to control exiting of the vehicle 100 from a parking space.

The parking-out system 740 may be referred to as a vehicle parking-out control apparatus.

The parking system 750 may control parking of the vehicle 100.

The parking system 750 may receive navigation information from the navigation system 770 and provide a control signal to the vehicle drive device 600 so as to control parking of the vehicle 100.

The parking system 750 may receive object information from the object detection device 300 and provide a control signal to the vehicle drive device 600 so as to control parking of the vehicle 100.

The parking system 750 may receive a signal from an external device through the communication device 400 and provide a control signal to the vehicle drive device 600 so as to control parking of the vehicle 100.

The vehicle parking 750 may be a system which includes at least one selected from among the user interface apparatus 270, the object detection device 300, the communication device 400, the driving manipulation device 500, the vehicle drive device 600, the navigation system 700, the sensing unit 120, and the controller 170 so as to control parking of the vehicle 100.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as a subordinate element of the user interface apparatus 200.

The sensing unit 120 may sense the state of the vehicle. The sensing unit 120 may include an Internal Measurement Unit (IMU) sensor, a collision sensor, a wheel sensor, a speed sensor, a gradient sensor, a weight sensor, a heading sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

In some implementations, the IMU sensor may include one or more of an accelerometer, a gyro sensor, and a magnetic sensor.

The sensing unit 120 may acquire sensing signals with regard to, for example, vehicle attitude information, vehicle motion information, vehicle yaw information, vehicle roll information, vehicle pitch information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as a sub-element of the controller 170.

The controller 170 may control the overall operation of each unit inside the vehicle 100

The controller 170 may be referred to as an Electronic Control Unit (ECU).

The power supply unit 190 may supply power required to operate each component under control of the controller 170. In particular, the power supply unit 190 may receive power from, for example, a battery inside the vehicle 100.

One or more processors and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
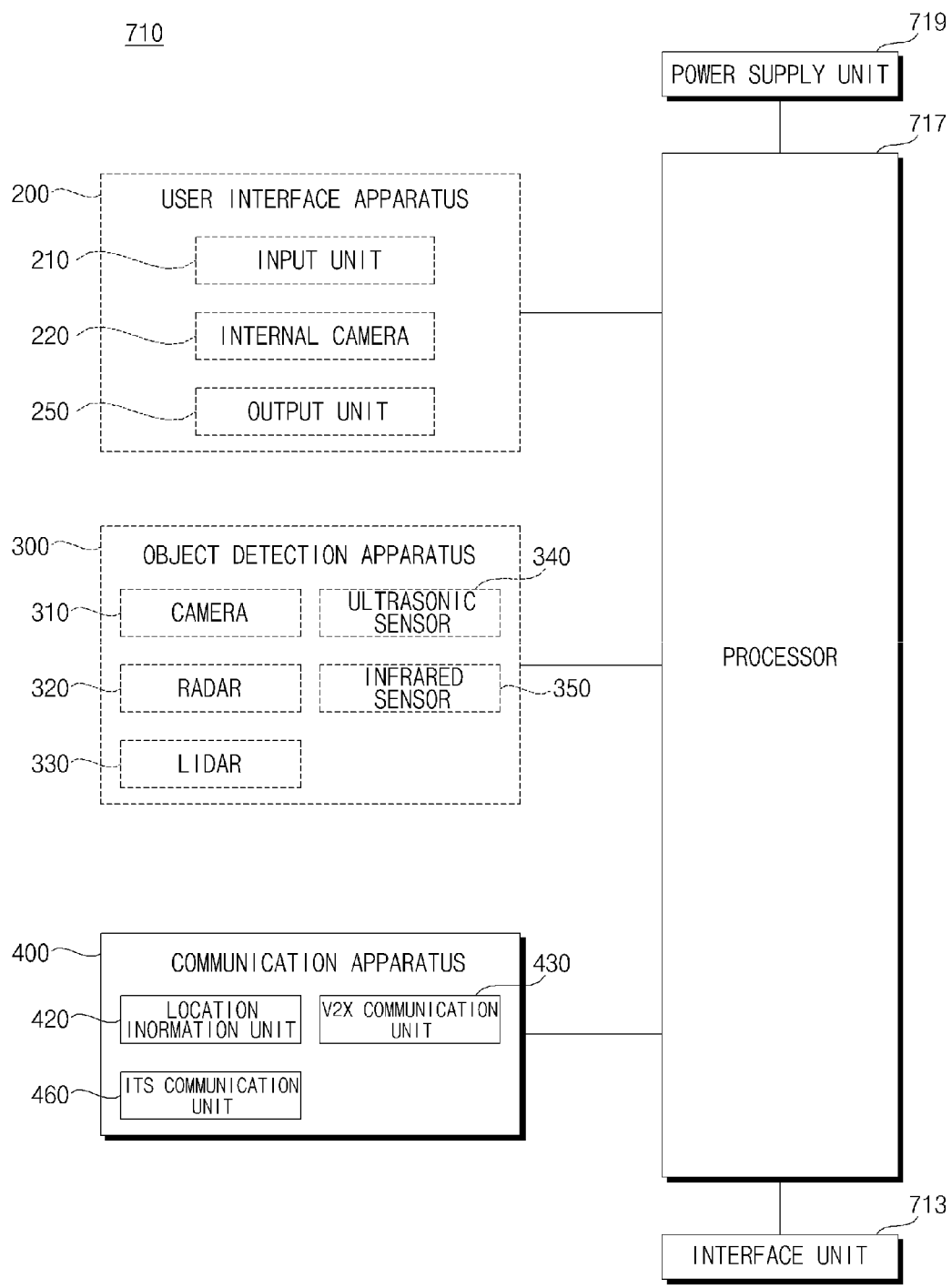
FIG. 8 is a block diagram illustrating an example of a driving system for a vehicle according to an implementation.

FIG. 8 is a block diagram illustrating a driving system for a vehicle according to an implementation.

Referring to FIG. 8, the description about the driving system 710 provided above with reference to FIG. 7 may be applied to a driving system 710 shown in FIG. 8.

The driving system 710 may be provided in the vehicle 100 which travels along a preset route.

A route may be set by a user input which is received through a user interface apparatus 200.

A route may be set by an external device through the communication apparatus 400.

A route may be set by the controller 170 or at least one processor included in the vehicle 100.

A route may include a plurality of zones.

The driving system 710 may include a communication apparatus 400, at least one processor such as processor 717, an interface unit 713, and a power supply unit 719.

In some implementations, the driving system 710 may include at least one of a user interface apparatus 200, an object detection apparatus 300, and a location information unit 430.

The description about the user interface apparatus 200 provided above with reference to FIGS. 1 to 7 may be applied to the user interface apparatus 200 shown in FIG. 8.

The user interface apparatus 200 may output information, received by the communication apparatus 400, through an output unit 250.

For example, the user interface apparatus 200 may output Advanced Driver Assistance System (ADAS) information to be used in a scheduled travel zone.

The description about the object detection apparatus 300 provided with reference to FIGS. 1 to 7 may be applied to the object detection apparatus 300 shown in FIG. 8.

The description about the communication apparatus 400 provided with reference to FIGS. 1 to 7 may be applied to the communication apparatus 400 shown in FIG. 8.

The communication apparatus 400 may exchange data, information, and a signal with an external device over at least one of Intelligent Transport Systems (ITS), Dedicated Short-range Communications (DRSC), Wireless Access for Vehicle Environment (WAVE), and Long Term Evolution (LTE).

The communication apparatus 400 may operate under the control of the processor 717.

The communication apparatus 400 may communicate with an external device using at least one of a V2X communication unit 430 and an ITS communication unit 460.

The communication apparatus 400 may receive ADAS information from the external device.

The communication apparatus 400 may receive ADAS information which is based on location information of the vehicle 100.

The communication apparatus 400 may receive ADAS information to be used in a scheduled travel zone which is a zone that the vehicle 100 is scheduled to travel.

For example, the communication apparatus 400 may receive information about an ADAS which another vehicle used to travel the scheduled travel zone for the vehicle 100.

For example, the communication apparatus 400 may receive, from a server, information about an ADAS which a plurality of other vehicles used to travel the scheduled travel zone for the vehicle 100, the information which is accumulated and stored in the server.

The communication apparatus 400 may receive, from an external device, information about use of an ADAS which another vehicle used in the scheduled travel zone.

The communication apparatus 400 may receive, from an external device, information about another vehicle's ADAS in which an error has occurred.

For example, the communication apparatus 400 may receive, from the external device, information about another vehicle's ADAS in which an error has occurred in the scheduled travel zone.

For example, the communication apparatus 400 may receive, from the external device, information about a sensor in which an error occurs in the scheduled travel zone.

The communication apparatus 400 may transmit, to an external device, ADAS information generated when the vehicle 100 travels a zone.

For example, when the vehicle 100 is traveling a specific zone, the communication apparatus 400 may transmit information which is based on a signal generated by the processor 717. The information may be information about an ADAS used in the specific zone. The information may be information about a sensor in which an error occurs in the specific zone. The information may be object information generated by the object detection apparatus 300 in the specific zone.

In some implementations, the external device may be at least one of another vehicle and a server.

The communication apparatus 400 may receive driving situation information which is based on location information of the vehicle 100.

The communication apparatus 400 may receive driving situation information for a scheduled travel zone for the vehicle 100.

The driving situation information may include at least one of weather information, accident occurrence information, construction information, traffic congestion information, and surrounding object information.

The communication apparatus 400 may receive whether information for a scheduled travel zone. The weather information may be generated by another vehicle travelling in the scheduled travel zone.

The communication apparatus 400 may receive, from the external device, first information about an ADAS used in the scheduled travel zone under a specific weather condition.

The communication apparatus 400 may receive, from the external device, second information about a sensor in which an error occurs in the scheduled travel zones under the specific weather.

The communication apparatus 400 may receive, from the external device, at least one of accident occurrence information and construction information for the scheduled travel zone.

The communication apparatus 400 may receive, from the external device, traffic congestion information about the scheduled travel zone.

The communication apparatus 400 may receive, from another vehicle, information about an object located in the scheduled travel zone.

For example, the communication apparatus 400 may receive information about an object, which is generated based on sensing data of an object detection sensor included in another vehicle.

The communication apparatus 400 may receive, from an external device, third information about an ADAS used in a highway zone which the vehicle 100 is scheduled to travel.

The communication apparatus 400 may receive, from an external device, fourth information about an ADAS used in an intersection zone which the vehicle 100 is scheduled to travel.

The communication apparatus 400 may receive, from an external device, fifth information about an ADAS used in a curved zone which the vehicle 100 is scheduled to travel.

The communication apparatus 400 may receive, from an external device, sixth information about an ADAS used in a zone where a roadway is not defined by traffic lines.

The communication apparatus 400 may receive information about a stop sign indicated by a traffic lamp located ahead in a direction of travel of the vehicle 100.

The location information 430 may acquire location information of the vehicle 100 using a Global Positioning System (GPS) or a Differential Global Positioning System (DGPS).

In some implementations, the location information unit 430 may be classified as a sub-element of the communication apparatus 400.

In some implementations, the location information unit 430 may be classified as an element independent of the communication apparatus 400.

The communication apparatus 400 may receive vehicle control information of another vehicle.

The communication apparatus 400 may receive vehicle control information of another vehicle travelling a scheduled travel zone.

The vehicle control information of another vehicle may be control information about the corresponding vehicle's drive apparatus which operates based on control of an ADAS.

For example, the vehicle control information of another vehicle may be control information about at least one of the corresponding vehicle's power source, brake device, and steering device which operate based on control of an ADAS.

The interface unknit 313 may serve as a passage to exchange data with other devices included in the vehicle 100.

The interface unit 713 may receive data from an electrically connected unit, and transmit a signal processed or generated by the processor 717 to the electrically connected unit.

The interface unit 713 may transmit received information, data, or signal to the processor 717. The interface unit 713 may transmit information, data or a signal generated or processed by the processor 717 to another device included in the vehicle 100.

For example, the interface unit 713 may provide a signal generated by the processor 717 to the vehicle drive apparatus 600.

For example, the interface unit 713 may receive information about a preset route from the navigation system 770.

For example, the interface unit 713 may receive sensing data from the sensing unit 120.

The processor 717 may be electrically connected to each unit of the driving system 710 so as to control overall operation of each unit of the driving system 710.

The processor 717 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 717 may receive, from the communication apparatus 400, ADAS information which is based on location information of the vehicle 100.

The processor 717 may receive information about an ADAS used in a scheduled travel zone from the communication apparatus 400. The scheduled travel zone may be included in a preset route.

ADAS information of another vehicle may include at least one of the following: information about a type of an ADAS used in a specific zone, information about a sensor used by the ADAS, information indicating that an error occurs to the ADAS in the specific zone, information indicating that an error occurs to a sensor used by the ADAS in the specific zone.

Based on the received ADAS information, the processor 717 may determine whether to use at least one of a plurality of ADASs.

Based on the determination, the processor 717 may provide a control for controlling at least one of a steering operation, a brake operation, and an acceleration operation.

The plurality of ADASs includes at least one of the following: an Adaptive Cruise Control (ACC) system, an Autonomous Emergency Braking (AEB) system, a Forward Collision Warning (FCW) system, a Lane Keeping Assist (LKA) system, a Lane Change Assist (LCA) system, a Target Following Assist (TFA) system, a Blind Spot Detection (BPD) system, a High Beam Assist (HBA) system, an Auto Parking System (APS) system, a pedestrian (PD) collision warning system, a Traffic Sign Recognition (TSR) system, A Traffic Sign Assist (TSA) system, a Night Vision (NV) system, a Driver Status Monitoring (DSM) system, and a Traffic Jam Assist (TJA) system.

The TFA system is a system which controls the vehicle 100 to follow a preceding vehicle in a space where a roadway is not defined. The space where a roadway is not defined is a space where a traffic line for defining a lane do not exist. The TFA system is a system which controls the vehicle 100 to temporarily follow a preceding vehicle, without a preset speed and a preset vehicle to be followed, until a traffic line is detected.

The TSA system is a system which controls at least one of a steering operation, a brake operation, and an acceleration operation with respect to the vehicle 100 based on a recognized traffic sign.

Through the communication apparatus 400, the processor 717 may acquire information about use of an ADAS in a scheduled travel zone by another vehicle.

Based about the acquired information about use of an ADAS by another vehicle, the processor 717 may determine whether to use at least one of the plurality of ADASs.

The acquired information about use of an ADAS by another vehicle may be information, which is generated by a plurality of other vehicles and accumulated a preset number of times.

For example, when a plurality of other vehicles passes through a scheduled travel zone, each of the plurality of other vehicles may transmit information about an ADAS in use to a server. The server may accumulate and store received information. Through the communication apparatus 400, the processor 717 may receive accumulated information, and determine, based on the received information, whether to use at least one of the plurality of ADASs.

Based on the received information, the processor 717 may determine whether the vehicle 100 includes an ADAS used by another vehicle.

Based on the received information, the processor 717 may determine whether the vehicle 100 includes a sensor used by another vehicle's ADAS.

When it is determined that the vehicle 100 does not include an ADAS used by another vehicle or a sensor used by the ADAS, the processor 717 may search for the corresponding vehicle travelling in the scheduled travel zone.

The processor 717 may receive vehicle control information relevant to the scheduled travel zone from a found vehicle.

Based on the received vehicle control information, the processor 717 may provide a control signal for controlling at least one of a steering operation, a brake operation, and an accelerating operation when the vehicle 100 is travelling the scheduled travel zone.

Through the communication apparatus 400, the processor 717 may acquire information about an ADAS in which an error occurs in the scheduled travel zone.

The processor 717 may determine to turn off an ADAS in which an error occurs from among a plurality of ADASs when the vehicle 100 travels the scheduled travel zone.

Through the communication apparatus, the processor 717 may acquire information about a sensor in which an occurs in the scheduled travel zone.

Based on the acquired information about a sensor in which an error occurs, the processor 717 may determine to turn off an ADAS which uses sensor data in which an error occurs from among the plurality of ADASs.

For example, when another vehicle passes through a scheduled travel zone for the vehicle 100, an error may occur in a camera due to sunlight. In another example, when another vehicle enters a tunnel or is about to enter a tunnel, an error may occur to a camera due to difference in light quantities. In this case, the corresponding vehicle may transmit, to a server, error occurrence information which indicates that an error occurs to a camera in the scheduled travel zone. The processor 717 may receive the error occurrence information, and determine to turn off an ADAS which uses a camera from among the plurality of ADASs.

For example, when another vehicle passes through a curved zone with a guardrail, a radar or lidar may mistakenly recognize the guardrail as an obstacle. In this case, the corresponding vehicle may transmit, to a server, error occurrence information which indicates that an error occurs in the radar or lidar in the curved zone. The processor 717 may receive the error occurrence information, and determine to turn off an ADAS which uses the radar or lidar from among the plurality of ADASs.

The processor 717 may control the user interface apparatus 200 so that received information is output to the communication apparatus 400 through the output unit 250.

The processor 717 may control the user interface apparatus 200 so that information about an ADAS used in a scheduled travel zone is output through the output unit 250.

In some implementations, while the information is displayed, the processor 717 may receive, through the user interface apparatus 200, a user input for selecting use of any one of a plurality of ADASs.

The processor 717 may acquire location information of the vehicle 100 through the location information unit 430.

Based on the location information of the vehicle 100, the processor 717 may determine that the vehicle 100 is located within a preset range in the scheduled travel zone. In this case, based on information about an ADAS used in the scheduled travel zone, the processor 100 may determine whether to use at least one of the plurality of ADASs.

Based on the location information and speed information of the vehicle 100, the processor 717 may determine whether the vehicle 100 enters the scheduled travel zone within a preset time period. In this case, based on information about an ADAS used in the scheduled travel zone, the processor 717 may determine whether to use at least one of a plurality of ADASs.

In doing so, at an appropriate time, the driving system 710 may determine whether to use an ADAS.

Through the communication apparatus 400, the processor 717 may receive driving situation information which is based on location information of the vehicle 100.

Based on received ADAS information and driving situation information, the processor 717 may determine whether to use at least one of a plurality of ADASs.

Through the communication apparatus 400, the processor 717 may receive weather information for a scheduled travel zone for the vehicle 100.

Further based on the weather information, the processor 717 may determine whether to use at least one of the plurality of ADASs.

Through the communication apparatus 400, the processor 717 may acquire first information about an ADAS which is used in a scheduled travel zone under a specific weather condition.

Based on the first information, the processor 717 may determine whether to use at least one of the plurality of ADASs.

For example, the processor 717 may acquire first information about the LKA system, the LCA system, and the TSA system which are not used in a scheduled travel zone when it snows or it is foggy. Based on the first information, the processor 717 may determine to turn off the LKA system and the LCA system.

Through the communication apparatus 400, the processor 717 may acquire second information about an ADAS in which an error occurs in the scheduled travel zone under a specific weather condition.

Based on the second information, the processor 717 may determine whether to use at least one of a plurality of ADASs.

Based on the second information, the processor 717 may determine to turn off an ADAS in which an error occurs from among the plurality of ADASs.

For example, the processor 717 may acquire second information indicates that an error occurs to a camera in a scheduled travel zone under a rainy, snowy, or foggy weather condition. The processor 717 may determine to turn off an ADAS which uses a camera from among the plurality of ADASs. In another example, the processor 717 may change a sensor of the ADAS using a camera into a radar or lidar. In yet another example, the processor 717 may reduce the proportion of use of the camera and increase the proportion of use of the radar or lidar.

Through the communication apparatus 400, the processor 717 may acquire at least one of accident occurrence information and construction information for a scheduled travel zone.

Further based on at least one of the accident occurrence information and the construction information, the processor 717 may determine whether to use at least one of a plurality of ADASs.

For example, the processor 717 may determine to turn off ACC system and turn on the AEB system.

Using the ACC system when a road is in an abnormal condition due to an accident or construction may cause an accident. In addition, in an abnormal road condition, the AEB system may prevent an unpredicted accident.

Through the communication apparatus 400, the processor 717 may acquire traffic congestion information indicating traffic congestion in a scheduled travel zone.

Further based on the traffic congestion information, the processor 717 may determine whether to use at least one of a plurality of ADASs.

For example, the processor 717 may determine to turn off the AEB system and turn on the TJA system.

If the AEB system is turned on when the vehicle 100 is travelling in the vicinity of a preceding vehicle, the vehicle 100 may not be able to travel smoothly. In addition, if the TJA system is turned on when a road is busy due to heavy traffic, it may improve a driver's convenience.

In some implementations, traffic congestion may be defined by the number of vehicles (a density of vehicles) in a unit zone.

Alternatively, the traffic congestion may be defined by a zone where the vehicle 100 is allowed to travel at a certain speed.

Through the communication apparatus 400, the processor 717 may receive object located in a scheduled travel zone from another vehicle.

Further based on object information, the processor 717 may determine whether to use at least one of a plurality of ADASs.

For example, any one of sensors for detecting an object may not be provided in the vehicle 100. In this case, the processor 717 may receive information about an object, which is based on data acquired by a sensor provided in another vehicle. The object may be located in the scheduled travel zone. The processor 717 may determine an ADAS based on the information about the object.

For example, an expensive camera or lidar may not be provided in the vehicle 100. In this case, the processor 717 may receive information about an object, which is based on an image acquired by a camera or lidar provided in another vehicle. The object may be located in a scheduled travel zone. The processor 717 may determine an ADAS based on the information about the object.

Through the communication apparatus 400, the processor 717 may acquire third information about an ADAS used in a highway zone.

Based on the third information, the processor 717 may determine whether to use at least one of a plurality of ADASs.

For example, based on third information, the processor 717 may turn on the ACC system, the LKA system, and the BSD system.

In doing so, it is possible to secure a driver's convenience and make driving safe in highway without a user's settings.

Through the communication apparatus 400, the processor 717 may acquire fourth information about an ADAS in an intersection zone.

The processor 717 may determine whether to use at least one of a plurality of ADASs.

For example, based on the fourth information, the processor 717 may turn off the ACC system and turn on the AEB system.

In doing so, it is possible to cope with the change of a traffic signal at an intersection, secure a driver's convenience, and make driving safe.

Through the communication apparatus 400, the processor 717 may acquire fifth information about an ADAS used in a curved zone.

Based on the fifth information, the processor 717 may determine whether to at least one of a plurality of ADASs.

For example, based on the fifth information, the processor 717 may turn off the ACC system and turn on the AEB system.

In doing so, it is possible to prevent a problem possibly caused by confusion about which vehicle to be followed in a curved zone, while securing a driver's convenience and making driving safe.

Through the communication apparatus 400, the processor 717 may acquire sixth information about an ADAS used in a zone where a roadway is not defined.

Based on the sixth information, the processor 717 may determine whether to use at least one of a plurality of ADASs.

For example, based on the sixth information, the processor 717 may determine to turn off the LKA system and turn on the TFA system.

In doing so, even when there is no traffic line, it is possible to secure a driver's convenience and make driving safe by following a target vehicle without a user's settings.

Through the communication apparatus 400, the processor 717 may receive information about a stop sign indicated by a traffic lamp located in a direction of travel of the vehicle 100.

Further based on the information about the stop sign indicated by the traffic lamp, the processor 717 may determine to turn off the ACC system and turn on the AEB system.

Under the control of the processor 717, the power supply unit 719 may supply power required to operate each unit of the driving system 710. The power supply unit 719 may be supplied with power from a battery inside the vehicle 100.

Figure 9:
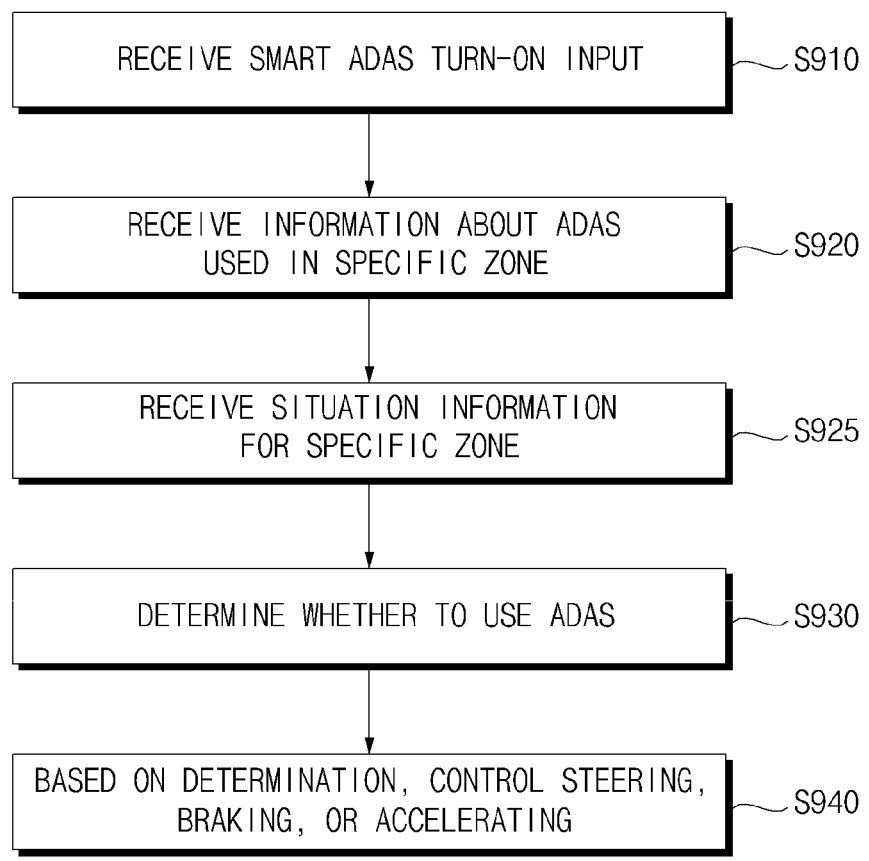
FIG. 9 is a flowchart illustrating an example of an operation of a driving system for a vehicle according to an implementation.

FIG. 9 is a flowchart of a driving system for a vehicle according to an implementation.

Referring to FIG. 9, through the input unit 210 of the user interface apparatus 200, the processor 717 may receive a smart ADAS turn-on input in S910.

The smart ADAS may be defined as a system which automatically determines, based on data, information, or a signal received from the communication apparatus 400, any of a plurality of ADASs to be used in a scheduled travel zone.

When the smart ADAS turn-on input is received, the processor 717 may receive information about an ADAS used in the scheduled travel zone from an external device through the communication apparatus 400 in S920. The scheduled travel zone may be included a route which is previously set by a user or at least one processor.

The information about an ADAS used in the scheduled travel zone may be generated by another vehicle which travelled the scheduled travel zone.

The corresponding vehicle may transmit, to a server, information about an ADAS used in the scheduled travel zone.

The server may receive information about an ADAS which a plurality of other vehicles used in the scheduled travel zone, and then the server may accumulate and store such information.

The processor 717 may receive the accumulated information from the server through the communication apparatus 400.

The processor 717 may receive situation information about the scheduled travel zone in S925.

The situation information may include at least one of weather information for the scheduled travel zone, accident occurrence information for the scheduled travel zone, construction information for the scheduled travel zone, traffic congestion information for the scheduled travel zone, and object information generated by another vehicle with respect to the scheduled travel zone.

Based on the received information, the processor 717 may determine whether to use at least one of the plurality of ADASs in S930.

Based on information about an ADAS used in the scheduled travel zone, the processor 717 may determine whether to use at least one of the plurality of ADASs.

For example, through the communication apparatus 400, the processor 717 may acquire third information about an ADAS used in a highway zone. In this case, based on the third information, the processor 717 may determine to turn on the ACC system, the LKA system, and the BSD system.

For example, through the communication apparatus 400, the processor 717 may acquire fourth information about an ADAS used in an intersection zone. In this case, based on the fourth information, the processor 717 may determine to turn off the ACC system and turn on the AEB system.

For example, through the communication apparatus 400, the processor 717 may acquire fifth information about an ADAS used in a curved zone. In this case, based on the fifth information, the processor 717 may determine to turn off the ACC system and turn on the AEB system.

For example, through the communication system 400, the processor 717 may acquire sixth information about an ADAS used in a zone where a roadway is not defined. In this case, based on the sixth information, the processor 717 may determine to turn off the LKA system and turn on the TFA system.

Based on information about an ADAS used in the scheduled travel zone and situation information in the scheduled travel zone, the processor 717 may determine whether to use at least one of the plurality of ADASs.

For example, through the communication apparatus 400, the processor 717 may acquire first information about an ADAS used in the scheduled travel zone under a specific weather condition. In this case, based on the first information, the processor 717 may determine whether to use at least one of the plurality of ADASs.

For example, through the communication apparatus 400, the processor 717 may acquire second information about a sensor in which an error occurs in the scheduled travel zone under a specific weather condition. In this case, based on the second information, the processor 717 may determine whether to use at least one of the plurality of ADASs.

For example, through the communication apparatus 400, the processor 717 may acquire at least one of accident occurrence information and construction information for the scheduled travel zone. In this case, the processor 717 may determine to turn off the ACC system and turn on the AEB system.

For example, through the communication apparatus 400, the processor 717 may acquire at least one of accident occurrence information and construction information for the scheduled travel zone. In this case, the processor 717 may determine to turn off the ACC system and turn on the AEB system.

For example, further based on object information, the processor 717 may determine whether to use at least one of the plurality of ADASs.

Based on the determination, the processor 717 may provide a signal for controlling at least one of a steering operation, a brake operation, and an accelerating operation to the vehicle drive apparatus 600 through the interface unit 713 in S940.

Based on the signal received from the driving system 710, the vehicle drive apparatus 600 may control operating at least one of a steering device, a brake device, and a power source.

Figure 10:
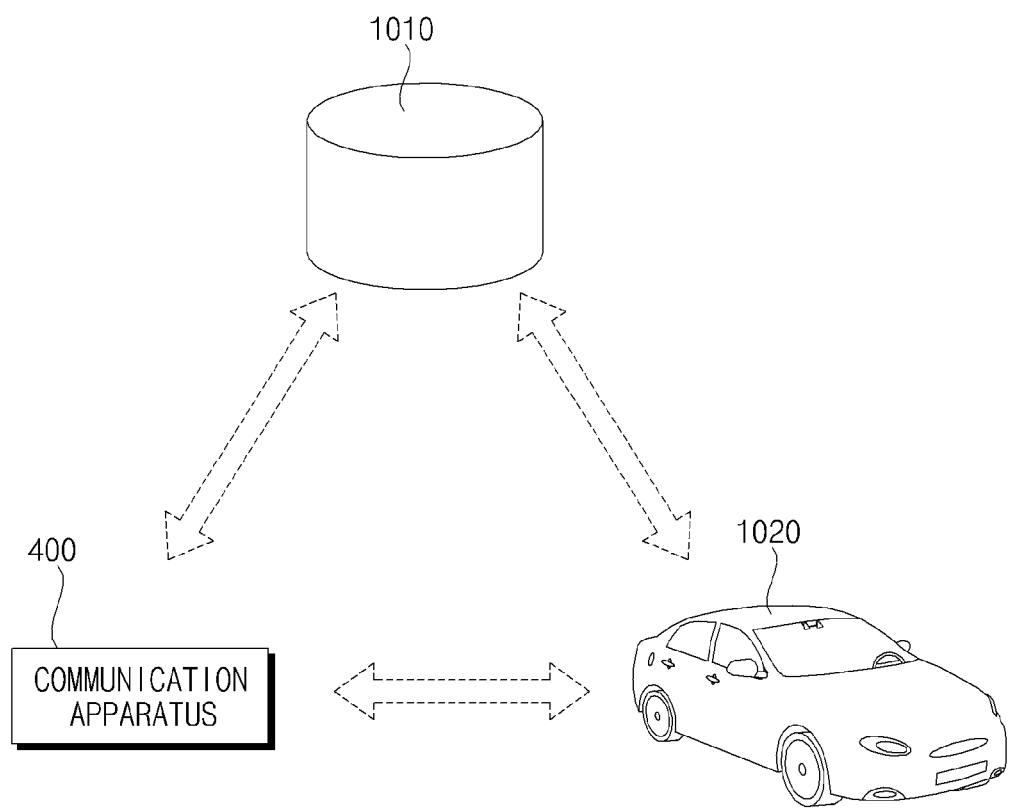
FIG. 10 is a diagram illustrating an example of an operation of a communication apparatus according to an implementation.

FIG. 10 is a diagram illustrating an operation of a communication apparatus according to an implementation.

Referring to FIG. 10, the communication apparatus 400 may communicate with external devices 1010 and 1020.

The communication apparatus 400 may communicate with a server 1010.

The server 1010 may be any one of a plurality of servers in a traffic system.

The server 1010 may receive and store data, information, and signals generated by a plurality of other vehicles 1020.

The server 1010 may receive information about a ADAS used in each zone from the plurality of other vehicles 1020, and store the received information.

The server 1010 may accumulate and store information about an ADAS used in each zone.

The server 1010 may accumulate and store information about an ADAS used in each zone on an hourly basis. The communication apparatus 400 may receive the accumulated information about an ADAS used in each zone on an hourly basis. In this case, each zone may be a scheduled travel zone for the vehicle 100.

The server 1010 may accumulate and store information about an ADAS used in each zone on the basis of seven days a week. The communication apparatus 400 may receive the accumulated information on an ADAS used in each zone on the basis of seven days a week. In this case, each zone may be a scheduled travel zone for the vehicle 100.

The server 1010 may accumulate and store information about an ADAS used in each zone on the basis of weather conditions. The communication apparatus 400 may receive the accumulated information about an ADAS used in each zone on the basis of weather conditions. In this case, a zone may be a scheduled travel zone for the vehicle 100.

The server 1010 may accumulate and store information about an ADAS used in each zone on the basis of volumes of traffic. The communication apparatus 400 may receive the accumulated information about an ADAS used in each zone on the basis of volumes of traffic. In this case, a zone may be a scheduled travel zone for the vehicle 100.

The communication apparatus 400 may transmit information about an ADAS used in each zone to the server 1010.

Figure 11:
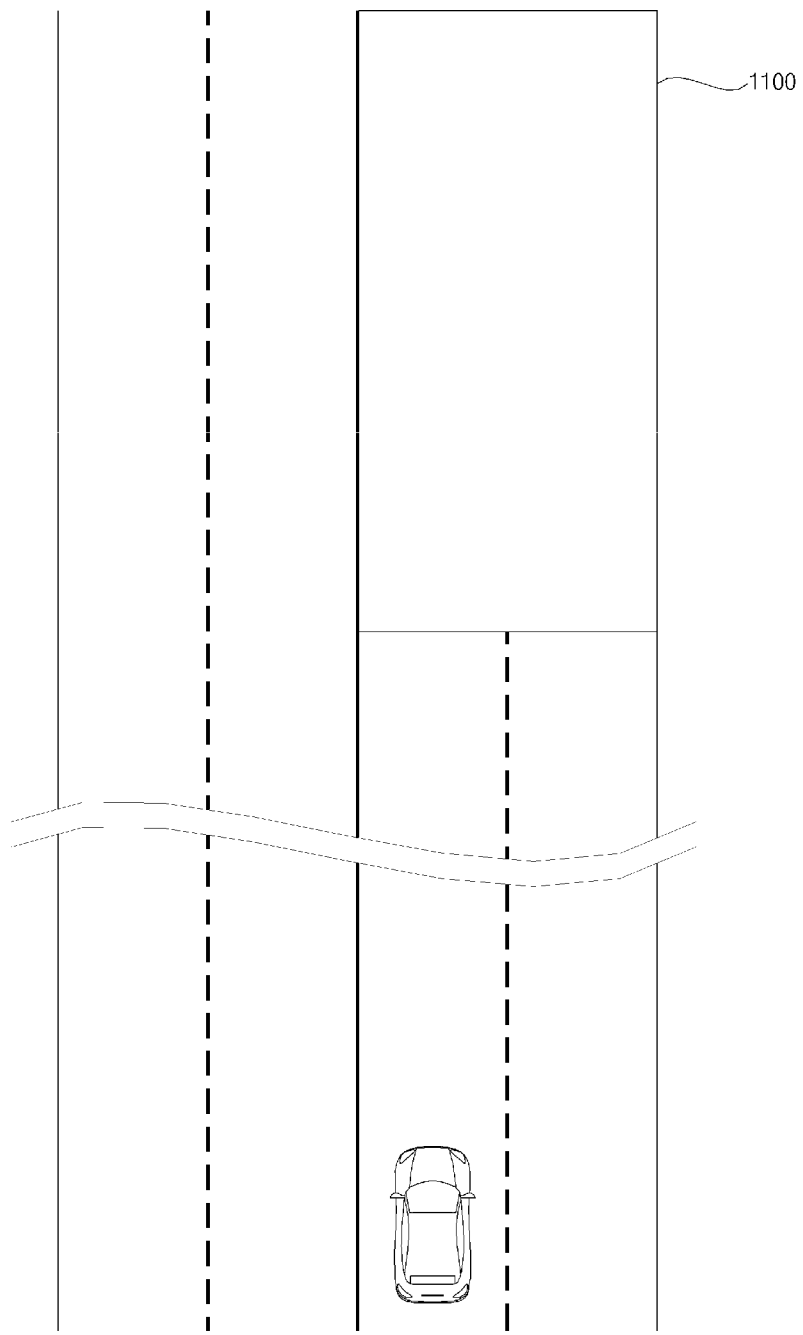
FIG. 11 is a diagram illustrating an example of an operation of a driving system according to an implementation.

FIG. 11 is a diagram illustrating a driving system according to the present disclosure.

Referring to FIG. 11, the processor 717 may acquire information about a zone 1100.

The processor 717 may acquire information about the zone 1100 from the navigation system 770.

A zone may be a scheduled travel zone which is included in a preset route and which the vehicle 100 is scheduled to travel.

For example, the zone may be any one of a highway zone, an intersection zone, a curved zone, and a zone where a roadway is not defined.

The processor 717 may receive information about an ADAS used in a scheduled travel zone through the communication apparatus 400.

Based on the received information, the processor 717 may determine whether to use at least one of a plurality of ADAS.

Based on the determination, the processor 717 may provide a signal for controlling at least one of a steering device, a brake device, and a power source.

Through the communication apparatus 400, the processor 717 may acquire information about a sensor in which an error occurs in the scheduled travel zone.

Based on the information about a sensor in which an error occurs in the scheduled travel zone, the processor 717 may determine turn off an ADAS which uses sensor data in which an error occurs from among the plurality of ADASs.

For example, the processor 717 may acquire information about a sensor in which an error occurs, based on whether the vehicle 100 is under driver override condition in a specific zone. Suppose that a first ADAS using a first sensor is used in a first zone. In the first zone, a plurality of other vehicles may be driven by their drivers, not by their ADASs. In this case, the server may determine the first zone to be a driver override zone. The server may determine the first zone to be a zone in which an error occurs to the first sensor.

Based on location information of the vehicle acquired by the location information unit 430 and speed information of the vehicle 100, the processor 717 may determine whether the vehicle 100 enters the zone 1100 within a preset period of time. If it is determined that the vehicle 100 enters the zone 1100 within the preset time period, the processor 717 may determine, based on information, whether to use at least one of a plurality of ADASs.

Figure 12:
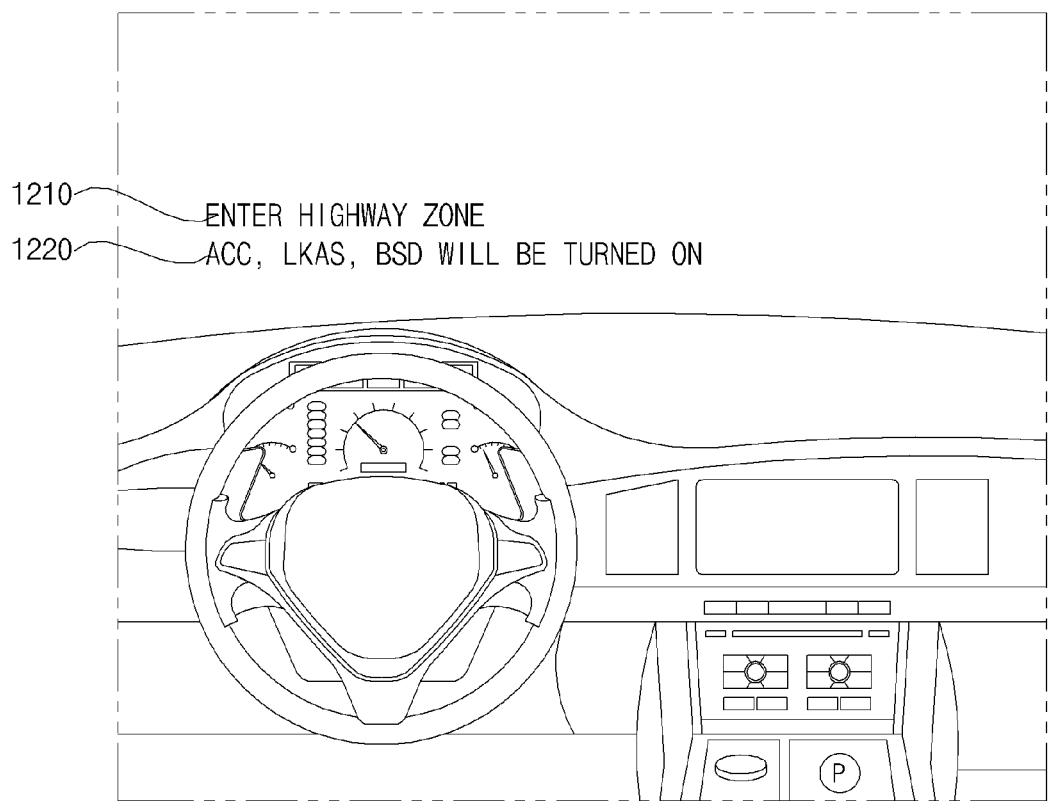
FIG. 12 is a diagram illustrating an example of an operation of a driving system for a vehicle according to an implementation.

FIG. 12 is a diagram for explaining a driving system for a vehicle according to an implementation.

Referring to FIG. 12, the processor 717 may control the user interface apparatus 200 so as to output information through the output unit 250.

The processor 717 may control the user interface apparatus 200 so as to output information 1210 about a scheduled travel zone for the vehicle 100.

The processor 717 may control the user interface apparatus 200 so as to output information 1220 about an ADAS which is determined to be used in a scheduled travel zone for the vehicle 100.

In some implementations, the processor 717 may control the user interface apparatus 200 so as to output a confirmation message for confirming whether to use the determined ADAS. In this case, the processor 717 may or may not use the determined ADAS based on a user input received through the input unit 210.

Figure 13:
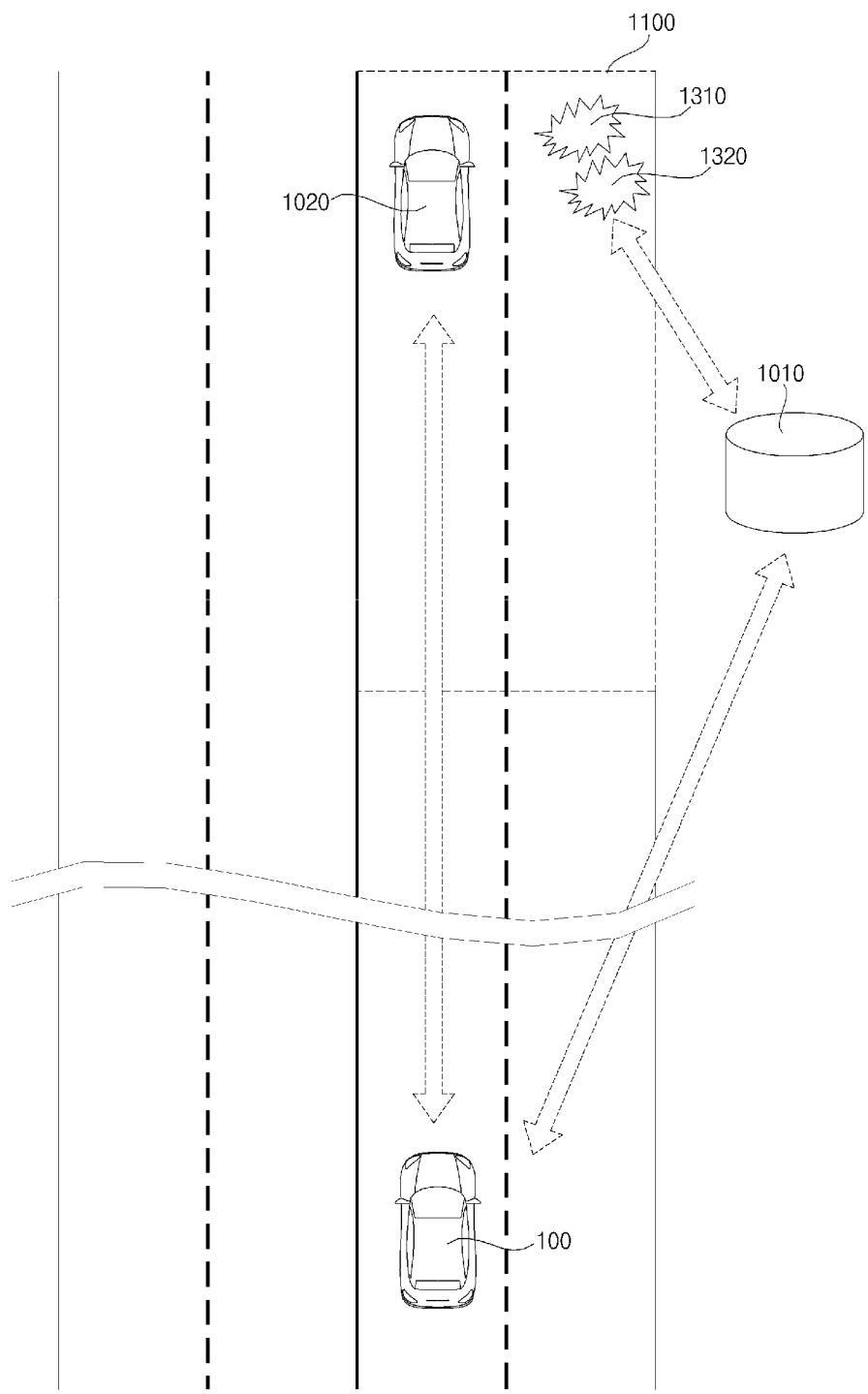
FIG. 13 is a diagram illustrating an example of an operation of a driving system according to an implementation.

FIG. 13 is a diagram for explaining a driving system according to an implementation.

Referring to FIG. 13, the processor 717 may acquire, through the communication apparatus 400, information about use of an ADAS by another vehicle 1020 in a zone 1100.

The processor 717 may determine whether to use at least one of a plurality of ADASs based on the information about use of an ADAS by another vehicle 1020.

Another vehicle 1020 may be a vehicle which travelled the zone 1100 prior to the vehicle 100.

The processor 717 may receive information about use of an ADAS by another vehicle 1020 from a server 1010 through the communication apparatus 400.

The server 1010 may receive information about an ADAS used or not used in travelling the zone 1100 from a plurality of other vehicles 1020.

The server 1010 may accumulate and store received information. Based on the accumulated and stored information, the server 1010 may determine at least one ADAS which is used in the zone 1100. In addition, based on the accumulated and stored information, the server 1010 may determine an ADAS not used in the zone 1100.

In some implementations, the processor 717 may acquire information about use of an ADAS from another vehicle 1020 through the communication apparatus 400.

In some implementations, the processor 717 may receive situation information for the zone 1100 through the communication apparatus 400.

The processor 717 may determine whether to use at least one of a plurality of ADASs based on the information about use of an ADAS in the zone 1100 and the situation information for the zone 1100.

The situation information for the zone 1100 may be generated by another vehicle 1020 which already travelled the zone 1100.

The situation information for the zone 1100 may include weather information for the zone 1100, accident occurrence information for the zone 1100, construction information for the zone 1100, traffic congestion information for the zone 1100, and object information for the zone 1100.

The processor 717 may receive the weather information for the zone 1100 through the communication apparatus 400.

The processor 717 may determine whether to use at least one of the plurality of ADASs, based on the information about use of an ADAS in the zone 1100 and the weather information.

The processor 717 may receive the weather information for the zone 1100 from the server 1010 or another vehicle 1020 through the communication apparatus 400.

The processor 717 may acquire first information about an ADAS used in the zone under a specific weather condition. Based on the first information, the processor 717 may determine whether to use at least one of the plurality of ADASs. Through the communication apparatus 400, the processor 717 may acquire second information about a sensor in which an error occurs in the zone 1100 under the specific weather condition. Based on the second information, the processor 717 may determine whether to use at least one of the plurality of ADASs.

The processor 717 may acquire at least one of accident occurrence information 1310 and construction information 1320 for the zone 1100 through the zone 1100.

Based on the information about use of an ADAS in the zone 1100 and at least one of the accidence occurrence information 1310 and the construction information 1320, the processor 717 may determine at least one of the plurality of ADASs. Specifically, the processor 717 may determine to turn off the ACC system and turn on the AEB system.

The processor 717 may acquire traffic congestion information for the zone 1100 through the communication apparatus 400.

Further based on the information about an ADAS in the zone 1100 and the traffic congestion information for the zone 1100, the processor 717 may determine whether to use at least one of the plurality of ADASs. Specifically, the processor 717 may determine to turn off the AEB system and turn on the TJA system.

The processor 717 may acquire information about an object located in the zone 1100 (e.g., information about occurrence of an accident 1310 or a construction site 1320) from another vehicle 1020 through the communication apparatus 400.

Based on the information about use of an ADAS and object information, the processor 717 may determine whether to use at least one of the plurality of ADASs.

Figure 14:
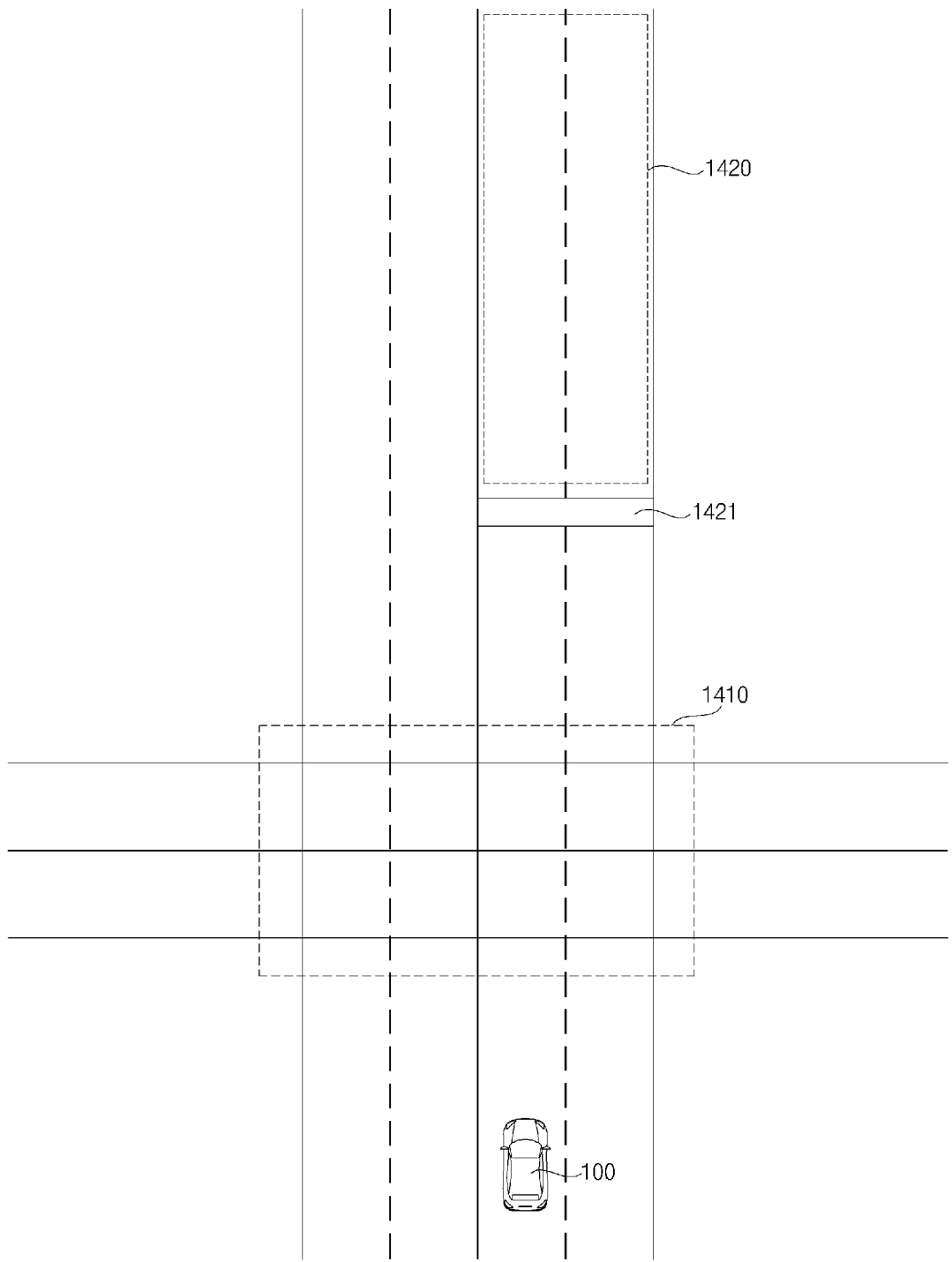
FIG. 14 is a diagram illustrating an example of an operation of a driving system according to an implementation.

FIG. 14 is a diagram for explaining a driving system according to an implementation.

Referring to FIG. 14, the processor 717 may acquire fourth information about an ADAS used in an intersection zone 1410, through the communication apparatus 400.

Based on the fourth information, the processor 717 may determine to turn off the ACC system and turn on the AEB system.

The vehicle 100 approaching an intersection may fail to cross the intersection because a traffic signal is changed after a vehicle being followed by the vehicle 100 crosses the intersection.

In addition, there may be another vehicle approaching the intersection 1410 from a direction different from a direction of travel of the vehicle 100, or a pedestrian attempting to cross the roadway.

In this case, whether to use an ADAS may be determined to make driving safe.

The vehicle 100 may about to pass a tollgate 1421 to enter a highway zone 1420.

When the vehicle 100 approaching the tollgate 1421 (e.g., when approaching within a preset distance from a tollgate), the processor 717 may turn off the ACC system and turn on the AEB system and the BSD system. In this case, the processor 717 may provide a control signal so that the vehicle 100 travels at a reference speed or less.

Through the communication apparatus 400, the processor 717 may acquire third information about an ADAS used in the highway zone 1420.

Based on the third information, the processor 717 may determine to turn on the ACC system, the LKA system, and the BSD system.

Figure 15:
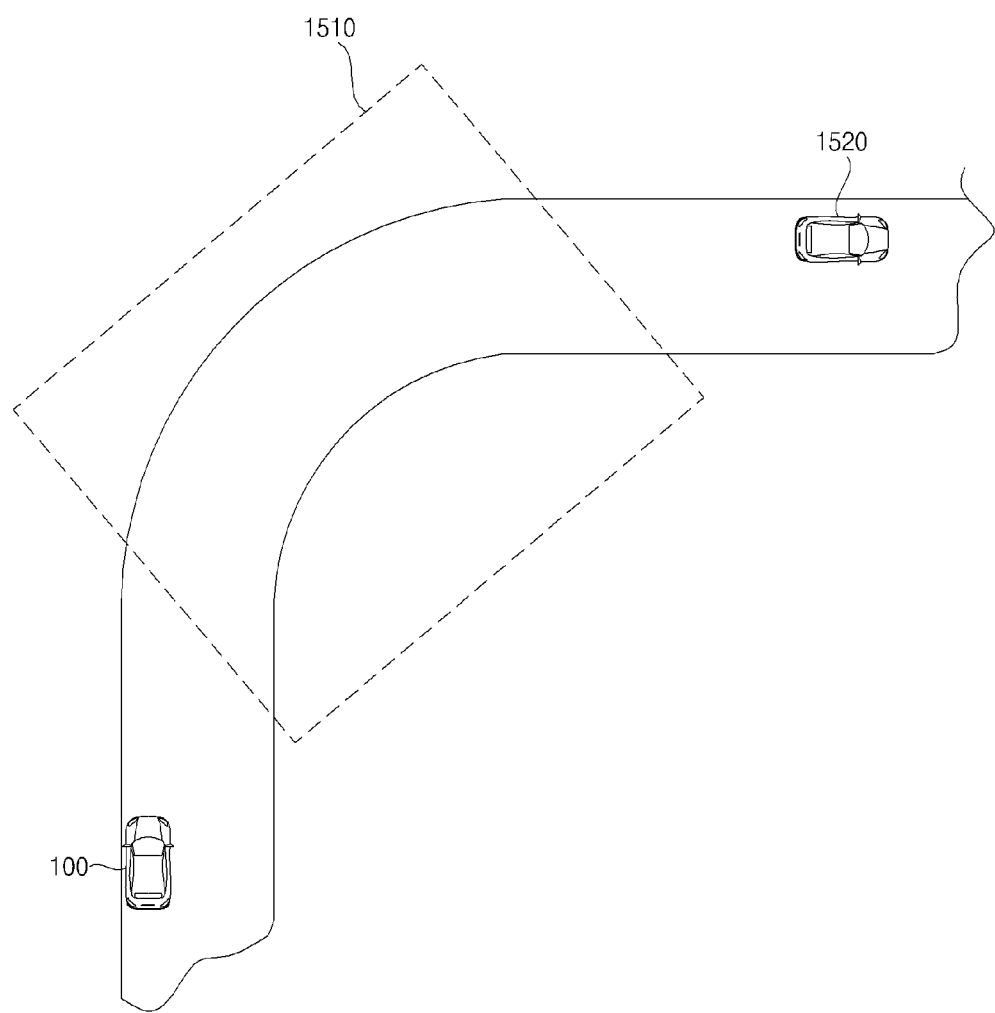
FIG. 15 is a diagram illustrating an example of an operation of a driving system according to an implementation.

FIG. 15 is a diagram for explaining an operation of a driving system according to an implementation.

Referring to FIG. 15, the processor 717 may acquire fifth information about an ADAS used in a curved zone 1510, through the communication apparatus 400.

Based on the fifth information, the processor 717 may determine to turn off the ACC system and turn on the AEB system.

In the curved zone 1510, a preceding vehicle 1520 may disappear out of a field of view (FOV) of each sensor included in the object detection apparatus 300. In this case, the ACC system may operate abnormally.

In addition, it is hard for a driver to have a wide enough field of view in the curved zone 1510, and thus, the AEB system is needed.

FIG. 16 is a diagram for explaining an operation of a driving system according to an implementation.

Referring to FIG. 16, through the communication apparatus 400, the processor 717 may acquire sixth information about an ADAS used in a zone where a roadway is not defined.

Based on the sixth information, the processor 717 may determine to turn off the LKA system and turn on the TFA system.

Using the LKA system when travelling without a traffic line may cause an error to occur.

In addition, by following a preceding vehicle 1610 when travelling without a traffic line, the vehicle 100 may keep being driven by the control of the driving system 710.

Figure 17:
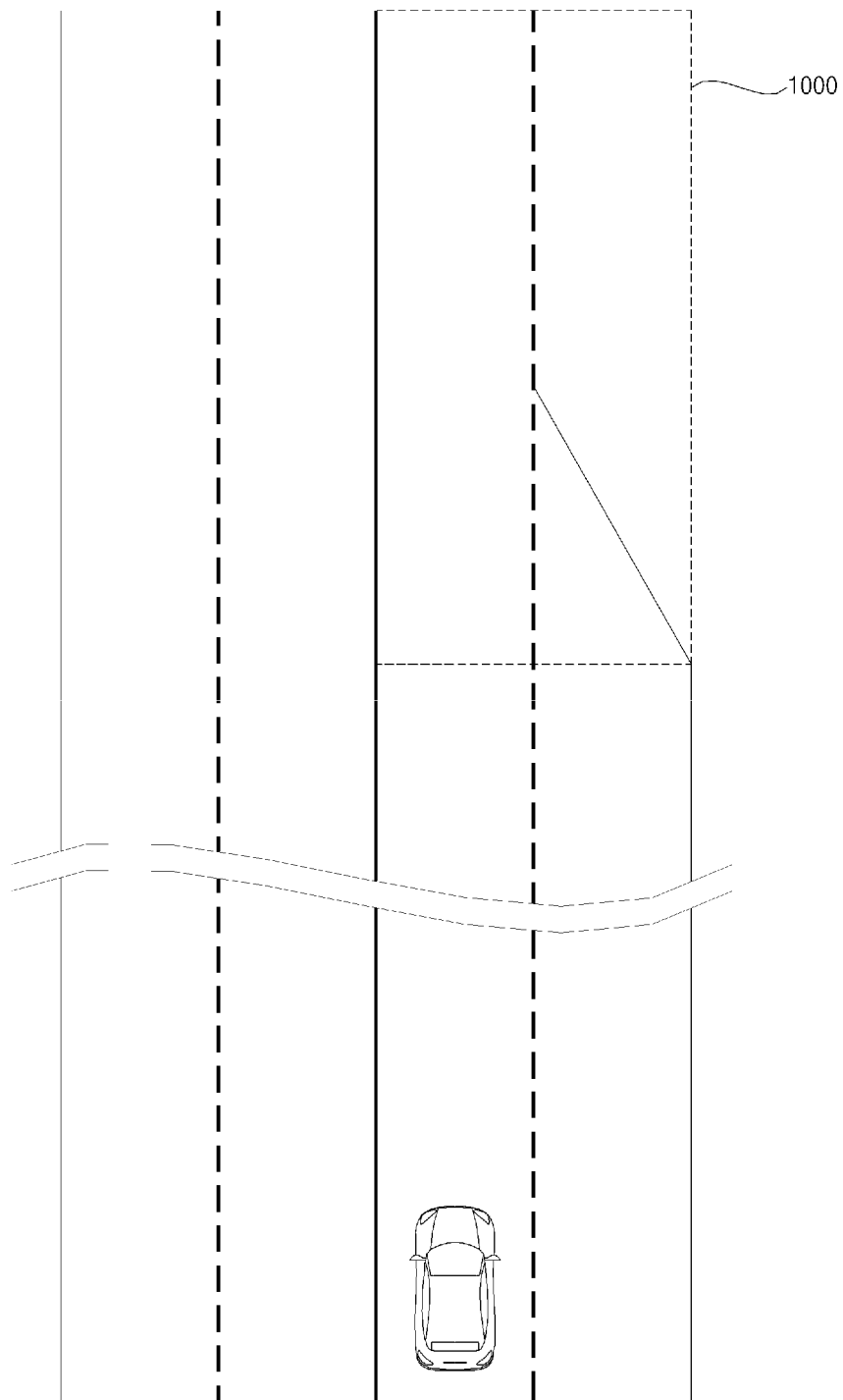
FIG. 17 is a diagram illustrating an example of an operation of a driving system according to an implementation.

FIG. 17 is a diagram for explaining an operation of a driving system according to an implementation.

Referring to FIG. 17, through the communication apparatus 400, the processor 717 may acquire seventh information about an ADAS used in a zone where lanes are reduced.

Based on the seventh information, the processor 717 may determine to turn off the LKA system and turn on the AEB system.

Lane change may be performed in the zone where lanes are reduced, and thus, using the LKA system in this zone may increase the probability of accidents.

In addition, in the zone where lanes are reduced, another vehicle is likely to enter a lane in which the vehicle 100 is now travelling, and thus, the AEB system is needed.

FIG. 18 is a table showing sensors and devices used by each ADAS according an implementation.

Referring to FIG. 18, the ACC system may utilize at least one of the camera 310, the radar 320, the lidar 330, and the V2X communication unit 430.

The LKA system may use at least one map received from the camera 310, the location information unit 420, and the navigation 770.

The LCA system may use at least one of the camera 310, the radar 320, the lidar 330, and the V2X communication unit 430.

The BSD system may use at least one of the radar 320, the lidar 330, and the V2X commutation unit 430.

The AEB system use at least one of the camera 310, the radar 320, the lidar 330, and the V2X communication unit 430.

The FCW system may use at least one of the camera 310, the radar 320, the lidar 330, and the V2X communication unit 430.

The PD collision warning system may use at least one of the camera 310, the radar 320, and the lidar 330.

The TSR system may use at least one map received from the V2X communication unit 430, the location information unit 420, and the navigation system 770.

The HBA system may use at least one of the camera 310 and the V2X communication unit 430.

The night vision system may use the infrared sensor 350.

The DSM system may use the internal camera 220.

The APS may use at least one map received from the camera 310, the radar 320, the lidar 330, the ultrasonic sensor 340, an around view monitor (AVM), the location information unit 420, and the navigation system 770.

The TJA system may use at least one of the camera 310, the radar 320, the lidar 330, and the ultrasonic sensor 340.

The table shown in FIG. 18 may be stored in a server 1010.

The communication apparatus 400 may receive information, included in the table shown in FIG. 18, from the server 1010.

FIG. 19 shows zones and situation information classified with reference to use of a plurality of ADASs according to an implementation.

Referring to FIG. 19, the server 1010 may store the table shown in FIG. 19 based on information received from a plurality of other vehicles 1020.

The server 1010 may store information that the ACC system is not used in an accident zone and a construction zone.

The server 1010 may store information that the ACC system is not used when a volume of traffic is equal to or greater than a reference number.

The server 1010 may store information that the AEB system and the FCW system are not used in a curved zone with a guardrail.

The server 1010 may store information that the LKA system is not used in an accident zone and a construction zone.

The server 1010 may store information that the LKA system is not used in a specific first zone.

The server 1010 may store information that the LCA system is not used in an accident zone and a construction zone.

The server 1010 may store information that the TFA system is not used in an accident zone and a construction zone.

The server 1010 may store information that the APS is not used in an accident zone and a construction zone.

The server 1010 may store information that the TSD system and the TSA system are not used in an accident zone and a construction zone.

The server 1010 may store information that the TJA system is not used in an accident zone and a construction zone.

The server 1010 may store information that the TJA system is not used before and after a highway interchange, in a junction at which roads meet or are separate, and in a steep curved zone.

The processor 717 may receive information, included in the table shown in FIG. 19, from the server 1010 through the communication apparatus 400. Based on the received information, the processor 717 may determine an ADAS used in a specific zone.

FIG. 20 shows an exemplary operation implemented by an ADAS using a V2X communication unit.

It is assumed that the object detection apparatus 300 is not provided in the vehicle 100 or that an error occurs to the object detection apparatus 300.

Figure 21:
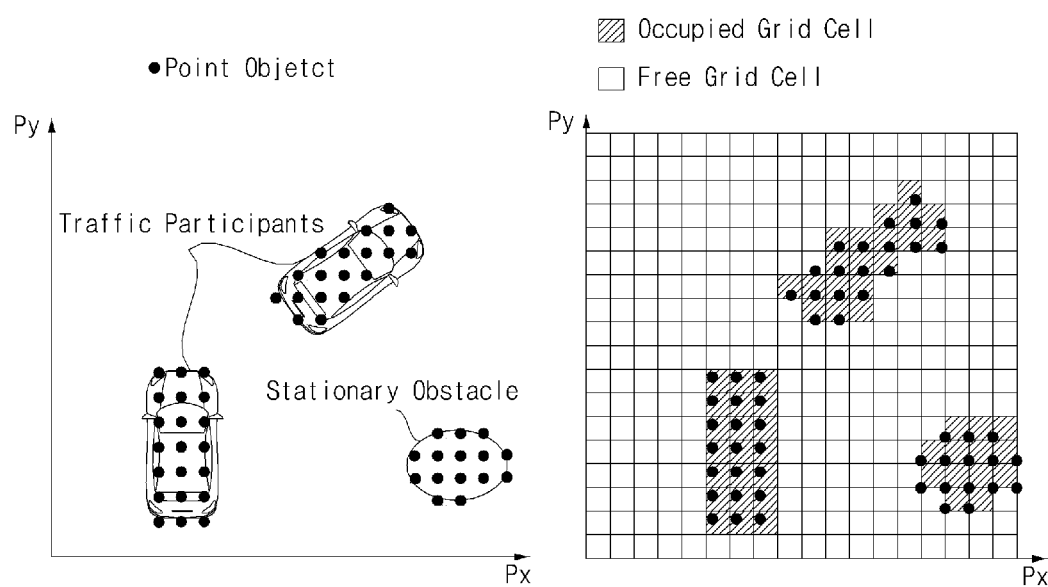
FIG. 21 is a diagram illustrating an example of an operation of a driving system according to an implementation.

FIG. 21 is a diagram for explaining a driving system according to an implementation.

Referring to FIG. 21, the communication apparatus 400 may receive object information generated by another vehicle from another vehicle through the communication apparatus 400.

The object information may be in the form of an occupied grid map, as shown in FIG. 21.

An occupied grid map may present a location of an object on a plane coordinate system.

Using the object detection apparatus, the processor 717 may acquire information about a location relationship (e.g., distance and direction) between the vehicle 100 and another vehicle.

The processor 717 may generate a modified occupied grid map by modifying a received occupied grid map based on the information about location relationship between the vehicle 100 and another vehicle. In this case, the modified occupied grid map is a map which is generated with respect to the vehicle 100.

The processor 717 may control driving of the vehicle 100 based on the modified occupied grid map.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A driving system for a vehicle, comprising:
   a communication apparatus;
   at least one processor; and
   a non-transitory computer-readable medium having stored thereon instructions that, when executed by the at least one processor, cause the at least one processor to perform operations comprising:
   receiving, through the communication apparatus, Advanced Driver Assistance system (ADAS) information that is based on a location of the vehicle,
   determining, based on the ADAS information, whether to use at least one ADAS for the vehicle,
   based on a determination of whether to use the at least one ADAS for the vehicle, providing a control signal for controlling at least one of a steering operation, a brake operation, or an acceleration operation of the vehicle,
   acquiring, through the communication apparatus, information about a utilization of a first ADAS used by a second vehicle in a scheduled travel zone of the vehicle, the information about the utilization of the first ADAS being generated by the second vehicle and accumulated for a preset number of times by a server,
   based on the information about the utilization of the first ADAS used by the second vehicle, determining whether to use the at least one ADAS for the vehicle,
   acquiring, through the communication apparatus, information about a second ADAS for the second vehicle that generates an error in the scheduled travel zone of the vehicle, and
   determining to turn off one of the at least one ADAS for the vehicle corresponding to the second ADAS for the second vehicle.

2. The driving system according to claim 1, wherein the operations further comprise:
   based on a determination that either the vehicle does not include the first ADAS used by the second vehicle or that the vehicle does not include a sensor used by the first ADAS, receiving, from the second vehicle, vehicle control information relevant to the scheduled travel zone of the vehicle,
   wherein providing the control signal for controlling the at least one of the steering operation, the brake operation, or the acceleration operation of the vehicle is further based on the vehicle control information received from the second vehicle.

3. The driving system according to claim 1, wherein determining, based on the ADAS information, whether to use at least one ADAS for the vehicle comprises:
   determining, based on the ADAS information, at least one of the first ADAS that is to be utilized for the vehicle or the second ADAS that is not to be utilized for the vehicle based on the location of the vehicle.

4. The driving system according to claim 1, wherein the operations further comprise:
   transmitting, through the communication apparatus and to at least one of other vehicles or the server, ADAS information generated in the scheduled travel zone of the vehicle.

5. The driving system according to claim 1, further comprising a user interface apparatus,
   wherein the operations further comprise controlling the user interface apparatus to output the ADAS information.

6. The driving system according to claim 1, wherein the operations further comprise:
   receiving, through the communication apparatus, driving situation information that is based on the location of the vehicle,
   wherein determining whether to use at least one ADAS for the vehicle is further based on the received driving situation information.

7. The driving system according to claim 6, wherein the operations further comprise:
   receiving, through the communication apparatus, weather information for the scheduled travel zone of the vehicle,
   wherein determining whether to use at least one ADAS for the vehicle is further based on the received weather information.

8. The driving system according to claim 7, wherein the operations further comprise:
receiving, through the communication apparatus, first information about the first ADAS used in the scheduled travel zone of the vehicle under a first weather condition,
wherein determining whether to use at least one ADAS for the vehicle is further based on the received first information about the first ADAS that is used in the scheduled travel zone under the first weather condition.

9. The driving system according to claim 7, wherein the operations further comprise:
receiving, through the communication apparatus, second information about the first ADAS for which an error occurs in the scheduled travel zone of the vehicle under a first weather condition; and
based on the second information, determining to deactivate, in the vehicle, the first ADAS for which the error occurs in the scheduled travel zone under the first weather condition.

10. The driving system according to claim 6, wherein the operations further comprise:
receiving, through the communication apparatus, at least one of accident occurrence information or construction information for the scheduled travel zone of the vehicle,
wherein determining whether to use at least one ADAS for the vehicle is further based on the at least one of the accident occurrence information or the construction information.

11. The driving system according to claim 10, wherein the operations further comprise:
determining to deactivate an Adaptive Cruise Control (ACC) system and to activate an Autonomous Emergency Braking (AEB) system of the vehicle.

12. The driving system according to claim 6, wherein the operations further comprise:
receiving, through the communication apparatus, traffic congestion information for the scheduled travel zone of the vehicle,
wherein determining whether to use at least one ADAS for the vehicle is further based on the traffic congestion information for the scheduled travel zone of the vehicle.

13. The driving system according to claim 12, wherein the operations further comprise:
determining to deactivate an Autonomous Emergency Braking (AEB) system and to activate a Traffic Jam Assist (TJA) system.

14. The driving system according to claim 6, wherein the operations further comprise:
receiving, through the communication apparatus and from a second vehicle, information about an object located in the scheduled travel zone of the vehicle, and
wherein determining whether to use at least one ADAS for the vehicle is further configured to, further based on the information about the object located in the scheduled travel zone of the vehicle.

15. The driving system according to claim 1, wherein the operations further comprise:
receiving, through the communication apparatus, third information about the first ADAS used in a highway zone; and
based on the third information, activating an Adaptive Cruise Control (ACC) system, a Lane Keeping Assist (LKA) system, and a Blind Spot Detection (BPD) system of the vehicle.

16. The driving system according to claim 1, wherein the operations further comprise:
receiving, through the communication apparatus, fourth information about the first ADAS used in an intersection zone; and
based on the fourth information, determining to deactivate an Adaptive Cruise Control (ACC) system and turn on an Autonomous Emergency Braking (AEB) system of the vehicle.

17. The driving system according to claim 1, wherein the operations further comprise:
receiving, through the communication apparatus, fifth information about the first ADAS used in a curved zone; and
based on the fifth information, determining to deactivate an Adaptive Cruise Control (ACC) system and to activate an Autonomous Emergency Braking (AEB) system of the vehicle.

18. The driving system according to claim 1, wherein the operations further comprise:
receiving, through the communication apparatus, sixth information about an ADAS used in a zone where a roadway is not defined; and
based on the sixth information, determining to turn off a Lane Keeping Assist (LKA) system and turn on a Target Following Assist (TFA) system of the vehicle.

19. A vehicle comprising:
a plurality of wheels; and
a driving system configured to control the plurality of wheels, the driving system comprising:
a communication apparatus,
at least one processor, and
a non-transitory computer-readable medium having stored thereon instructions that, when executed by the at least one processor, cause the at least one processor to perform operations comprising:
receiving, through the communication apparatus, Advanced Driver Assistance system (ADAS) information that is based on a location of the vehicle,
determining, based on the ADAS information, whether to use at least one ADAS for the vehicle,
based on a determination of whether to use the at least one ADAS for the vehicle, providing a control signal for controlling at least one of a steering operation, a brake operation, or an acceleration operation of the vehicle,
acquiring, through the communication apparatus, information about a utilization of a first ADAS used by a second vehicle in a scheduled travel zone of the vehicle, the information about the utilization of the first ADAS being generated by the second vehicle and accumulated for a preset number of times by a server,
based on the information about the utilization of the first ADAS used by the second vehicle, determining whether to use the at least one ADAS for the vehicle,
acquiring, through the communication apparatus, information about a second ADAS for the second vehicle that generates an error in the scheduled travel zone of the vehicle, and
determining to turn off one of the at least one ADAS for the vehicle corresponding to the second ADAS for the second vehicle.

* * * * *